(12) United States Patent
Harris et al.

(10) Patent No.: US 9,000,099 B2
(45) Date of Patent: Apr. 7, 2015

(54) FUNCTIONALIZED POLYMERS, ARTICLES PREPARED THEREFROM, AND METHODS FOR MAKING THE SAME

(75) Inventors: William J. Harris, Lake Jackson, TX (US); John D. Weaver, Lake Jackson, TX (US); Nelson G. Rondan, Missouri City, TX (US); Drew A. Davidock, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 498 days.

(21) Appl. No.: 12/669,194

(22) PCT Filed: Jul. 10, 2008

(86) PCT No.: PCT/US2008/069639
§ 371 (c)(1),
(2), (4) Date: Jan. 15, 2010

(87) PCT Pub. No.: WO2009/012113
PCT Pub. Date: Jan. 22, 2009

(65) Prior Publication Data
US 2010/0168343 A1    Jul. 1, 2010

Related U.S. Application Data

(60) Provisional application No. 60/950,006, filed on Jul. 16, 2007.

(51) Int. Cl.
*C08L 53/00*     (2006.01)
*C08F 255/02*    (2006.01)
*C08F 255/04*    (2006.01)
*C08L 51/06*     (2006.01)

(52) U.S. Cl.
CPC ............. *C08F 255/02* (2013.01); *C08F 255/04* (2013.01); *C08L 51/06* (2013.01)

(58) Field of Classification Search
CPC .... C08F 255/02; C08F 255/04; C08F 226/06; C08L 51/06; C08G 63/80
USPC ........................... 525/92 H, 93, 299, 302, 308
See application file for complete search history.

(56) References Cited

U.S. PATENT DOCUMENTS

| 4,599,385 A | | 7/1986 | Clayton et al. | |
| 4,762,890 A | | 8/1988 | Strait et al. | |
| 4,780,357 A | * | 10/1988 | Akao | 428/216 |
| 4,867,254 A | * | 9/1989 | Gavignet | 175/48 |
| 4,871,810 A | * | 10/1989 | Saltman | 525/133 |
| 5,032,459 A | * | 7/1991 | Toyoshima et al. | 428/424.8 |

(Continued)

FOREIGN PATENT DOCUMENTS

WO    WO-2004/113399 A2    12/2004
WO    WO-2006/086828 A1    8/2006

OTHER PUBLICATIONS

Snapshot of IDES Melt flow Rate Website retrieved Mar. 11, 2006 retrieved online from the Internet Archive: http://web.archive.org/web/20060311042246/http://www.ides.com/property_descriptions/ASTMD1238.asp.*

(Continued)

*Primary Examiner* — Mark Kaucher

(57) ABSTRACT

The invention provides compositions comprising at least one propylene-based polymer, at least one peroxide and at least one coagent. In a preferred example, a composition comprising at least one propylene-based polymer, at least one peroxide, at least one grafting agent, and at least one coagent, and wherein the at least one coagent has a substituted carbon-carbon double bond structure selected from the group consisting of structures (I), (II), (III), (IV) and (V) as follows, including cis and trans isomers wherein D1, D2, D3 and D4 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1, R2 and R3 are each, independently, H, a hydrocarbon substituent, or a substituted hydrocarbon substituent; and wherein R1, R2 and R3, each, independently, does not have the same chemical structure as D1, D2, D3 or D4; and wherein the molar ratio of the "coagent(s)" to "free radicals formed from the peroxide(s)" is from 0.5:1 to 5:1; and wherein the coagent selected from structures (I)-(V) does not contain only one phenyl group, or does not contain only one furyl group.

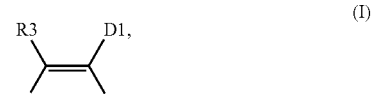

(I)

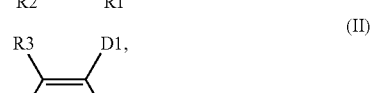

(II)

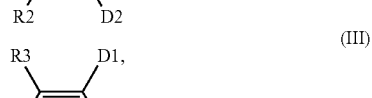

(III)

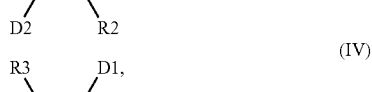

(IV)

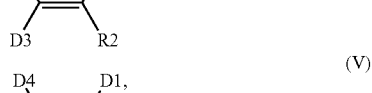

(V)

9 Claims, No Drawings

(56) References Cited

U.S. PATENT DOCUMENTS

| | | | |
|---|---|---|---|
| 5,344,886 A * | 9/1994 | Chang et al. | 525/285 |
| 5,939,184 A * | 8/1999 | Inoue et al. | 428/331 |
| 6,806,330 B1 | 10/2004 | Sonnenschein et al. | |
| 2005/0247391 A1 | 11/2005 | Ikuta | |
| 2006/0149000 A1 | 7/2006 | Ikuta et al. | |
| 2007/0292703 A1 | 12/2007 | Ikuta et al. | |

OTHER PUBLICATIONS

Machine Translation of JP 06-472459.*
Exchange and Free Radical Grafting Reactions in Reactive Extrusion, Makromol. Chem., Macromol. Symp., 1993, 75, 137-157.
Control of Degradation Reactions during Radical Functionalization of Polypropylene in the Melt, Macromolecules, 2004, 37, 8414-8423.
Heterogeneous Grafting of Maleic Anhydride and α-Methylstyrene from Atactic Polypropylene, Die Angewandte Makromolekulare Chemie, 1997, 251, 37-48 (Nr. 4326).
Radical Mediated Modification of Polypropylene; Selective Grafting Via Polyally Coagents, J. Polym. Sci.: Part A: Poly.Chem. 2005, 43, 4882-4893.
Reactive Extrusion: A New Tool for the Diversification of Polymeric Materials, Macromol. Symp., 87, 37-58 (1994).
Study on Styrene-Assisted Melt Free-Radical Grafting of Maleic Anhdride onto Polypropylene, Polymer, 2001, 42, 3419-3425.
Radical reactions on Polypropylene in the Solid State, Progress in Polymer Science, 2002, 27, 1195-1282.
Alternating Copolymer Graft Copolymers v. "Carboxylation" of Polymers by In-situ Spontaneous Bulk Polymerization of Styrene-Maleic Anhydride Complex, Polymer Letters Edition, vol. 10, 95-100 (1972).
Alternating Copolymer Grafting onto Polymer Films by a Vapor-Phase Grafting Technique, Polymer Letters Edition, vol. 10, 823-828 (1972).
Abstract: Japanese Publication JP 06172459.

* cited by examiner

FUNCTIONALIZED POLYMERS, ARTICLES PREPARED THEREFROM, AND METHODS FOR MAKING THE SAME

REFERENCE TO PRIOR APPLICATION

This application claims the benefit of Provisional Application No. 60/950,006 filed on Jul. 16, 2007, fully incorporated herein by reference.

BACKGROUND OF THE INVENTION

The present invention relates to functionalized polymers, compositions containing the same, articles prepared from the same, and methods for producing the same. In particular, the invention provides the radical melt functionalization(s) of polyolefins, such as propylene-based polymers, using certain coagents. Such functionalization processes result in functionalized polymers with enhanced molecular weights, as compared to the functionalized polymers formed from melt functionalization reactions in the absence of the coagents.

BACKGROUND

One of the major challenges in polymer chemistry continues to be the introduction of polarity and/or functionality into polypropylene (PP). This difficulty is typically due to the inability of coordination catalysts to tolerate and incorporate polar monomers into a growing polypropylene backbone, and the gross molecular weight degradation, via β-scission, of polypropylene during the radical functionalization reaction in a melt or solution state. Polypropylene has been functionalized by free radical mechanisms as disclosed in the art.

*Exchange and Free Radical Grafting Reactions in Reactive Extrusion*, Makromol. Chem., Macromol. Symp., 1993, 75, 137-157, discloses the use of coagents, including N-vinylpyrrolidinone, styrene, α-methylstyrene, and methyl methacrylate, in the grafting of maleic anhydride (MAH) onto polypropylene. The presence of electron-donating monomers, and, in particular, styrene, was disclosed as effective in improving yield and reducing degradation of the polypropylene.

*Control of Degradation Reactions during Radical Functionalization of Polypropylene in the Melt*, Macromolecules, 2004, 37, 8414-8423, discloses the use of furan derivatives, such as butyl 3-(2-furanyl)propenoate, ethyl 2-carboxyethyl-3-(2-furanyl)propenoate, and ethylcyano-3-(2-furanyl)propenoate, during the radical melt maleation of polypropylene for reduced degradation. The coagents described possess a heterocyclic aromatic ring conjugated to a double-bond bearing an electron attracting group.

International Publication No. WO 2004/113399 A2 discloses the controlled radical grafting of polyolefins, using at least one grafting compound having an electron donor heterocyclic aromatic ring conjugated to a least one —HC═CR1R2 group, and in which at least one of R1 and R2 are electron acceptors.

Japanese Publication JP 06172459 (Abstract) discloses the modification of polyolefins by peroxides, using modifiers in the presence of styrenic based materials including α-methylstyrene.

*Heterogeneous Grafting of Maleic Anhydride and α-Methylstyrene from Atactic Polypropylene*, Die Angewandte Makromolekulare Chemie, 1997, 251, 37-48 (Nr. 4326), discloses the use of α-methylstyrene in grafting of maleic anhydride onto atactic polypropylene. Emphasis in using α-methylstyrene is the prevention of color from the oligomerization of maleic anhydride with its subsequent degradation.

*Radical Mediated Modification of Polypropylene; Selective Grafting Via Polyally Coagents*, J. Polym. Sci.: Part A: Poly. Chem. 2005, 43, 4882-4893, discloses the use of triallyl trimellitate (TAM) as coagent in radical grafting of maleic anhydride onto polypropylene. Triallyl trimellitate is successful in reducing polypropylene degradation via a coupling mechanism that competes with the β-scission degradation process.

*Reactive Extrusion: A New Tool for the Diversification of Polymeric Materials*, Macromol. Symp., 87, 37-58 (1994), discloses reaction extrusion processes of several polymeric systems, including the grafting of maleic anhydride onto polyolefins using styrene.

*Study on Styrene-Assisted Melt Free-Radical Grafting of Maleic Anhdride onto Polypropylene*, Polymer, 2001, 42, 3419-3425, discloses the free-radical melt grafting of maleic anhydride and styrene onto polypropylene.

*Radical reactions on Polypropylene in the Solid State*, Progress in Polymer Science, 2002, 27, 1195-1282, discloses the solid state cografting styrene and maleic anhydride onto a polypropylene.

*Alternating Copolymer Graft Copolymers v. "Carboxylation" of Polymers by In-situ Spontaneous Bulk Polymerization of Styrene-Maleic Anhydride Complex*, Polymer Letters Edition, Vol. 10, 95-100 (1972), discloses the use of styrene in the formation of copolymers containing alternating styrene-maleic anhydride units on the backbone.

*Alternating Copolymer Grafting onto Polymer Films by a Vapor-Phase Grafting Technique*, Polymer Letters Edition, Vol. 10, 823-828 (1972), discloses a process for the alternating copolymer grafting using an additional comonomer in conjunction with maleic anhydride or ethylmaleimide.

There remains a need for a low cost process to effectively functionalize propylene-based polymers, while maintaining the molecular weight of the base polymer, or substantially reducing the base polymer's molecular weight degradation. Preferably, the functionalization takes place in a melt reactive extrusion process. There is a further need for high molecular weight functionalized propylene-based polymers with improved interfacial activity and reactivity. There is an additional need for such polymers with improved toughness and improved adhesive properties. Some of these needs and others have been met by the following invention.

SUMMARY OF THE INVENTION

The invention provides a composition comprising at least one propylene-based polymer, at least one peroxide, at least one grafting agent, and at least one coagent, and
  wherein the at least one coagent has a substituted carbon-carbon double bond structure selected from the group consisting of structures (I), (II), (III), (IV) and (V) as follows, including cis/trans isomers:

$$\underset{D2}{\overset{R3}{>}}=\underset{R2,}{\overset{D1}{<}} \quad (III)$$

$$\underset{D3}{\overset{R3}{>}}=\underset{D2,}{\overset{D1}{<}} \quad (IV)$$

$$\underset{D3}{\overset{D4}{>}}=\underset{D2;}{\overset{D1}{<}} \text{ and} \quad (V)$$

wherein D1, D2, D3 and D4 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1, R2 and R3 are each, independently, H, a hydrocarbon substituent, or a substituted hydrocarbon substituent; and wherein R1, R2 and R3, each, independently, does not have the same chemical structure as D1, D2, D3 or D4; and wherein the molar ratio of the "coagent(s)" to "free radicals formed from the peroxide(s)" is from 0.5:1 to 5:1, and preferably from 1:1 to 5:1; and wherein the coagent selected from structures (I)-(V) does not contain only one phenyl group, or does not contain only one furyl group. The molar amount of free radicals is determined from the theoretical yield of radicals from the peroxide.

The invention also provides a composition comprising at least one propylene-based polymer, and preferably a propylene-based interpolymer, at least one peroxide, at least one grafting agent, and at least one coagent, and wherein the coagent has a highest occupied molecular orbital (HOMO) energy level greater than −8 eV, preferably greater than −7 eV, and more preferably greater than −6 eV.

The invention also provides a composition comprising at least one propylene-based polymer, at least one peroxide, at least one grafting agent, and at least one coagent, and wherein the coagent has the structure (VI) as follows:

$$(VI)$$

wherein R is H, a hydrocarbon substituent, or a substituted hydrocarbon substituent.

The invention also provides a composition comprising at least one propylene-based polymer, at least one peroxide, at least one grafting agent, and at least one coagent, and wherein the at least one coagent has a substituted carbon-carbon double bond structure selected from the group consisting of structures (VII) and (VIII) as follows:

$$\underset{H}{\overset{H}{>}}=\underset{R1}{\overset{D1,}{<}} \quad (VII)$$

$$\underset{H}{\overset{H}{>}}=\underset{D2;}{\overset{D1}{<}} \text{ and} \quad (VIII)$$

wherein D1 and D2 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1 is H, a hydrocarbon substituent, or a substituted hydrocarbon substituent, and wherein R1 does not have the same chemical structure as D1 or D2.

The invention also provides a composition comprising at least one propylene-based polymer, at least one peroxide, and at least one coagent, and wherein the at least one coagent has a substituted carbon-carbon double bond structure selected from the group consisting of structures (IX), (X), (XI), (XII) and (XIII) as follows:

$$\underset{R2}{\overset{HOOCR'}{>}}=\underset{R1}{\overset{D1,}{<}} \quad (IX)$$

$$\underset{R2}{\overset{HOOCR'}{>}}=\underset{D1,}{\overset{R1}{<}} \quad (X)$$

$$\underset{R2}{\overset{HOOCR'}{>}}=\underset{D2,}{\overset{D1}{<}} \quad (XI)$$

$$\underset{D2}{\overset{HOOCR'}{>}}=\underset{R2,}{\overset{D1}{<}} \text{ and} \quad (XII)$$

$$\underset{D3}{\overset{HOOCR'}{>}}=\underset{D2,}{\overset{D1}{<}} \text{ and} \quad (XIII)$$

wherein D1, D2 and D3 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1 and R2 are each, independently, H, a hydrocarbon substituent, or a substituted hydrocarbon substituent, and wherein R' is a hydrocarbon group, a substituted hydrocarbon group, or R'COOH is COOH (R' is nil); and wherein R1 and R2, each, independently, does not have the same chemical structure as D1, D2, or D3, and R' is a —(CH$_2$)$_n$— group, where n=0 to 5; and wherein R'COOH does not have the same chemical structure as D1, D2, D3, R1 or R2.

The invention also provides articles prepared from the inventive composition, and for methods of making the inventive compositions and inventive articles.

DETAILED DESCRIPTION

Overview

As discussed above, the invention provides a composition comprising at least one propylene-based polymer, at least one peroxide, at least one grafting agent, and at least one coagent, and wherein the at least one coagent has a substituted carbon-carbon double bond structure selected from the group consisting of structures (I), (II), (III), (IV) and (V) as follows, including cis and trans isomers:

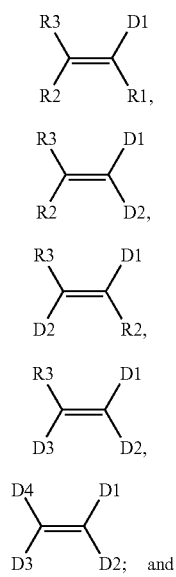

wherein D1, D2, D3 and D4 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1, R2 and R3 are each, independently, H, a hydrocarbon substituent, or a substituted hydrocarbon substituent; and wherein R1, R2 and R3, each, independently, does not have the same chemical structure as D1, D2, D3 or D4; and wherein the molar ratio of the "coagent(s)" to "free radicals formed from the peroxide(s)" is from 0.5:1 to 5:1; and wherein the coagent selected from structures (I)-(V) does not contain only one phenyl group, or does not contain only one furyl group.

In a further embodiment, the molar ratio of the "coagent(s)" to "free radicals formed from the peroxide(s)" is from 1:1 to 5:1. The molar amount of free radicals is determined from the theoretical yield of radicals from the peroxide.

In another embodiment, the at least one coagent has a substituted carbon-carbon double bond structure selected from the group consisting of structures (II), (III), (IV) and (V) as follows, including cis and trans isomers:

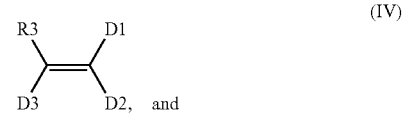

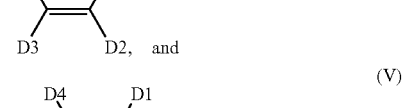

In another embodiment, the at least one coagent has the substituted carbon-carbon double bond structure of structure (I),

In another embodiment, the at least one coagent has the substituted carbon-carbon double bond structure of structure (II),

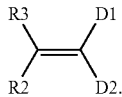

(II)

In another embodiment the at least one coagent has the substituted carbon-carbon double bond structure of structure (III),

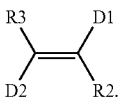

(III)

In another embodiment, the at least one coagent has the substituted carbon-carbon double bond structure of structure (IV),

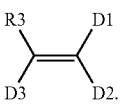

(IV)

In another embodiment, the at least one coagent has the substituted carbon-carbon double bond structure of structure (V),

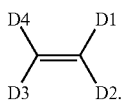

(V)

In another embodiment, the at least one coagent has a substituted carbon-carbon double bond structure selected from the group consisting of the following:

In another embodiment, the coagent has a HOMO greater than −8 eV, preferably greater than −7 eV, and more preferably greater than −6 eV.

The invention also provides a composition comprising at least one propylene-based polymer, at least one peroxide, at least one grafting agent, and at least one coagent, and wherein the coagent has the structure (VI) as follows:

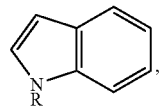

(VI)

wherein R is H, a hydrocarbon substituent, or a substituted hydrocarbon substituent. In a further embodiment, the molar ratio of the "coagent(s)" to "free radicals formed from the peroxide(s)" is from 0.5:1 to 5:1. In another embodiment, the molar ratio of the "coagent(s)" to "free radicals formed from the peroxide(s)" is from 1:1 to 5:1. The molar amount of free radicals is determined from the theoretical yield of radicals from the peroxide.

The invention also provides a composition comprising at least one propylene-based interpolymer, at least one peroxide, at least one grafting agent, and at least one coagent, and wherein the coagent has a HOMO greater than −8 eV, preferably greater than −7 eV, and more preferably greater than −6 eV. In a further embodiment, the molar ratio of the molar ratio of the "coagent(s)" to "free radicals formed from the peroxide(s)" is from 0.5:1 to 5:1. In another embodiment, the molar ratio of the molar ratio of the "coagent(s)" to "free radicals formed from the peroxide(s)" is from 1:1 to 5:1. The molar amount of free radicals is determined from the theoretical yield of radicals from the peroxide.

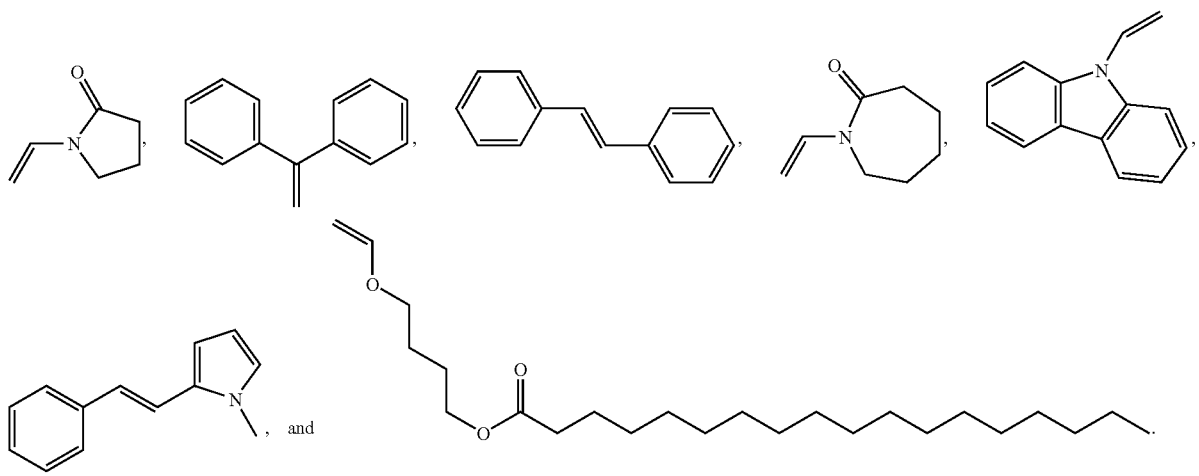

In another embodiment, the at least one coagent has a substituted carbon-carbon double bond structure selected from the group consisting of the following:
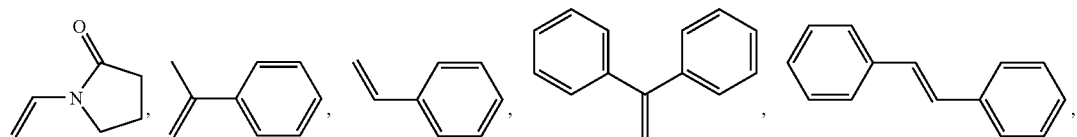
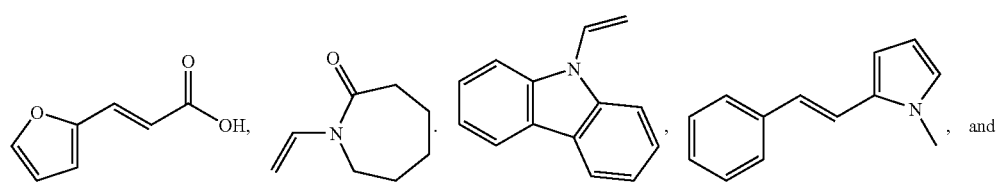
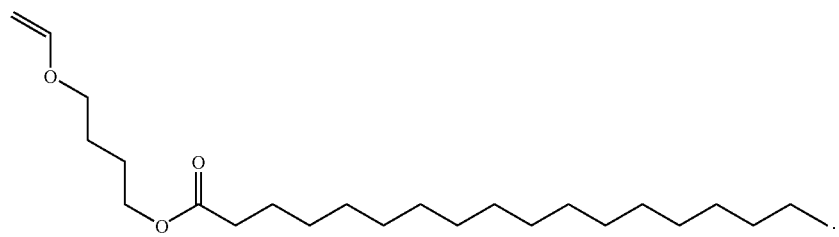
In another embodiment, the at least one coagent has a substituted carbon-carbon double bond structure selected from the group consisting of the following:
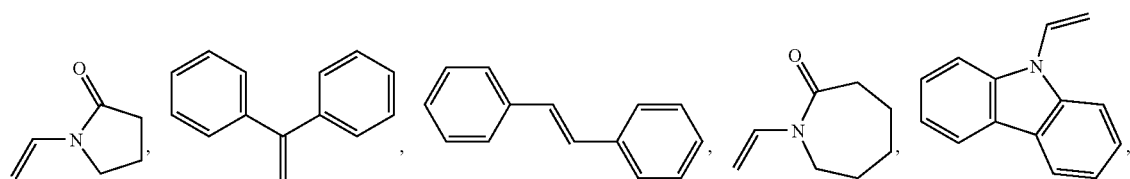
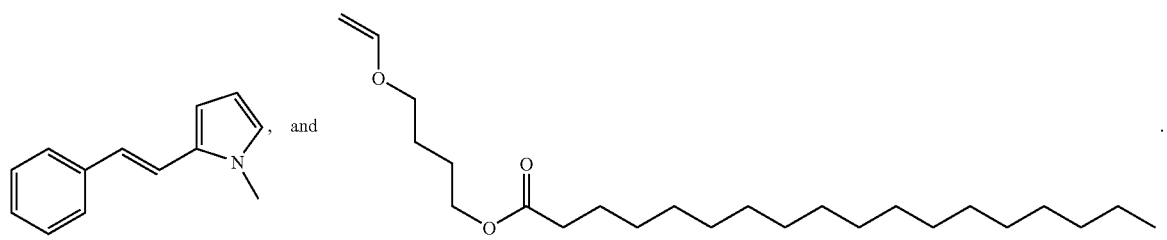

The invention also provides a composition comprising at least one propylene-based polymer, at least one peroxide, at least one grafting agent, and at least one coagent, and wherein the at least one coagent has a substituted carbon-carbon double bond structure selected from the group consisting of structures (VII) and (VIII) as follows:

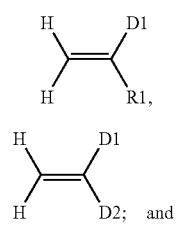

wherein D1 and D2 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1 is H, a hydrocarbon substituent, or a substituted hydrocarbon substituent, and wherein R1 does not have the same chemical structure as D1 or D2.

The invention also provides a composition comprising at least one propylene-based polymer, at least one peroxide, and at least one coagent, and wherein the at least one coagent has a substituted carbon-carbon double bond structure selected from the group consisting of structures (IX), (X), (XI), (XII) and (XIII) as follows:

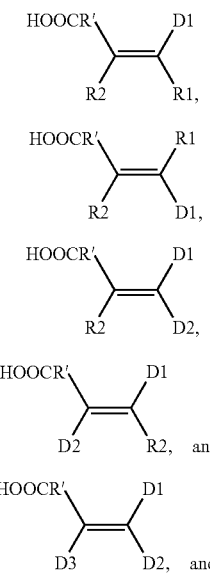

wherein D1, D2 and D3 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1 and R2 are each, independently, H, a hydrocarbon substituent, or a substituted hydrocarbon substituent, and wherein R' is a hydrocarbon group, a substituted hydrocarbon group, or R'COOH is COOH (R' is nil); and wherein R1 and R2, each, independently, does not have the same chemical structure as D1, D2, or D3, and R' is a —$(CH_2)_n$— group, where n=0 to 5; and wherein R'COOH does not have the same chemical structure as D1, D2, D3, R1 or R2.

In one embodiment, R' is a —$(CH_2)_n$— group, where n=0 to 5, and preferably n=0 to 3. In another embodiment, R' is an alkyl group or a substituted alkyl group. In another embodiment, R'COOH is COOH (R' is nil).

In one embodiment, the at least one coagent is selected from the group consisting of the following:

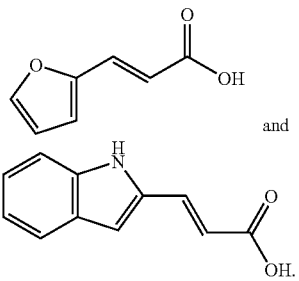

In another embodiment, the molar ratio of the "coagent(s)" to "free radicals formed from the peroxide(s)" is from 0.5:1 to 5:1. In another embodiment, the molar ratio of the "coagent(s)" to "free radicals formed from the peroxide(s)" is from 1:1 to 5:1. The molar amount of free radicals is determined from the theoretical yield of radicals from the peroxide.

An inventive composition may comprise a combination of two or more embodiments as described herein.

In a preferred embodiment, the propylene-based polymer is a propylene-based interpolymer.

In another embodiment, the propylene-based interpolymer has at least one of the following properties:
  (i) 13C NMR peaks corresponding to a regio-error at about 14.6 and about 15.7 ppm, the peaks of about equal intensity,
  (ii) a skewness index, Six, greater than about −1.20,
  (iii) a DSC curve with a $T_{me}$ that remains essentially the same, and a $T_{Max}$ that decreases as the amount of comonomer in the interpolymer is increased, and
  (iv) an X-ray diffraction pattern that reports more gamma-form crystals than a comparable interpolymer prepared with a Ziegler-Natta catalyst.

In another embodiment, the propylene-based interpolymer has at least one of the following properties:
  (i) 13C NMR peaks corresponding to a regio-error at about 14.6 and about 15.7 ppm, the peaks of about equal intensity,
  (ii) a skewness index, Six, greater than about −1.20, and
  (iii) a DSC curve with a $T_{me}$ that remains essentially the same, and a $T_{Max}$ that decreases as the amount of comonomer in the interpolymer is increased.

In another embodiment, the propylene-based interpolymer has at least one of the following properties:
(i) 13C NMR peaks corresponding to a regio-error at about 14.6 and about 15.7 ppm, the peaks of about equal intensity, and
(ii) a skewness index, Six, greater than about −1.20.

In another embodiment, the propylene-based interpolymer has 13C NMR peaks corresponding to a regio-error at about 14.6 and about 15.7 ppm, the peaks of about equal intensity, In another embodiment, the propylene-based polymer is a propylene/α-olefin interpolymer or a propylene/ethylene interpolymer.

In another embodiment, the propylene-based polymer is a propylene/α-olefin interpolymer, and wherein the α-olefin is a C3-C10 α-olefin. In a further embodiment the propylene/α-olefin interpolymer has a density from 0.83 g/cc to 0.90 g/cc. in another embodiment, the propylene/α-olefin interpolymer has a melt flow rate (MFR) from 0.1 g/10 min to 100 g/10 min.

In another embodiment, the propylene-based polymer is a propylene/ethylene interpolymer. In a further embodiment, the propylene/ethylene interpolymer has a density from 0.83 g/cc to 0.90 g/cc. In another embodiment, the propylene/ethylene interpolymer has melt flow rate (MFR) from 0.1 g/10 min to 100 g/10 min.

The propylene-based polymer may comprise a combination of two or more suitable embodiments as described herein.

The propylene/α-olefin interpolymer may comprise a combination of two or more suitable embodiments as described herein.

The propylene/ethylene interpolymer may comprise a combination of two or more suitable embodiments as described herein.

The invention also provides an article comprising at least one component formed from an inventive composition. In one embodiment, the article is selected from the group consisting of automotive parts, geomembranes, electrical cable insulation, and packaging materials.

The invention also provides a film comprising at least one component formed from an inventive composition.

The invention also provides a fiber comprising at least one component formed from an inventive composition.

The invention also provides a tie layer comprising at least one component formed from an inventive composition.

The invention also provides a blow molded article comprising at least one component formed from an inventive composition.

The invention also provides an injection molded article comprising at least one component formed from an inventive composition.

The invention also provides a sheet comprising at least one component formed from an inventive composition. In one embodiment, the sheet is an extruded sheet. In another embodiment, the sheet is a thermoformed sheet.

The invention also provides a functionalized propylene-based polymer formed by reacting an inventive composition. In a further embodiment, the reaction is a solid state reaction.

The invention also provides a functionalized propylene-based polymer formed by melt reacting an inventive composition. In a further embodiment, the reaction takes place in an extruder.

The invention also provides a composition comprising an inventive functionalized propylene-based polymer.

The invention also provides an article comprising at least one component formed from an inventive composition comprising the functionalized propylene-based polymer. In one embodiment, the article is selected from the group consisting of automotive parts, geomembranes, electrical cable insulation, and packaging materials.

The invention also provides a film comprising at least one component formed from an inventive composition comprising the functionalized propylene-based polymer.

The invention also provides a fiber comprising at least one component formed from an inventive composition comprising the functionalized propylene-based polymer.

The invention also provides a tie layer comprising at least one component formed from an inventive composition comprising the functionalized propylene-based polymer.

The invention also provides a blow molded article comprising at least one component formed from an inventive composition comprising the functionalized propylene-based polymer.

The invention also provides an injection molded article comprising at least one component formed from an inventive composition comprising the functionalized propylene-based polymer.

The invention also provides a sheet comprising at least one component formed from an inventive composition comprising the functionalized propylene-based polymer. In one embodiment, the sheet is an extruded sheet. In one embodiment, the sheet is a thermoformed sheet.

A functionalized propylene-based polymer may comprise a combination of two or more embodiments as described herein.

An inventive composition comprising a functionalized propylene-based polymer may comprise a combination of two or more embodiments as described herein.

An inventive article comprising at least one component formed from an inventive composition comprising a functionalized propylene-based polymer may comprise a combination of two or more embodiments as described herein.

The invention also provides a process for forming a functionalized propylene-based polymer, said process comprising reacting an inventive composition. In one embodiment, the reaction is a solid state reaction.

In another embodiment, said process comprising melt reacting an inventive composition. In a further embodiment, the melt reaction takes place in an extruder.

In another embodiment, the at least one coagent and the at least one grafting agent are both imbibed into the at least one propylene-based polymer before the composition is melt reacted. In a further embodiment, the composition is in the form of a dry blend during the imbibing process. In another embodiment, the imbibing takes place at room temperature.

In another embodiment, the propylene-based polymer is added to the extruder before the grafting agent and coagent. In another embodiment, the grafting agent is added to the extruder before the coagent.

An inventive process may comprise a combination of two or more suitable embodiments as described herein.

Coagents

The concept of radical electrophilicity/nucleophilicity and highest occupied molecular orbital (HOMO) energy level calculations are used to identify coagent candidates which led to maleated propylene polymers with substantial reduction in molecular weight degradation during radical functionalization. It was discovered that most of the coagents, by themselves, did not impede polymer degradation, but that there was a synergistic effect between maleic anhydride and the coagents. The functionalized polypropylenes of this invention, with their improved molecular weight and polar functionalities of acid, acid anhydride, anhydride and amine should possess increased interfacial activity and reactivity that can lead to improvements in toughening, adhesion, polymer blend compatibilization, dispersions, paintability, and the like.

It is likely that the critical first step in the grafting process, after the generation of a radical via the thermolysis of peroxide, is the abstraction of the tertiary hydrogen on polypropylene leading to a polypropylene macroradical. The polypropylene macroradical will quickly lead to PP degradation via a β-scission process, unless that radical is intercepted/stabilized by some species, in such a way that has the effect of translocating the free radical away from the polymer backbone, or the free radical reacts with some other species to generate a product that terminates the radical chain via some means such as disproportionation or recombination.

On this basis, the rapid and efficient reaction of the polypropylene macroradical with a coagent is one of the critical steps to functionalize polypropylene, without degrading the polypropylene. Using the concept of the polypropylene macroradical's electrophilicity to react with unsaturated substrates, molecular orbital calculations of the highest occupied molecular orbital (HOMO) of the unsaturated substrates can be used to identify coagent candidates. The HOMO energy, in units of electron volts (eV), can be used to assess the nucleophilicity of the unsaturated substrate. The more nucleophilic the unsaturated substrate, the less negative the HOMO energy, that is, the higher lying the HOMO.

The geometries and HOMO energies of the unsaturated substrates considered, were optimized using density functional theory (B3LYP) (see A. D, Becke, Phys. Rev. A 38, 3098 (1988); and C. Lee, W. Yang, R. G. Parr, Phys. Rev. B 37, 785 (1988)), and the 6-31G* basis set (see P. C. Hariharan and J. A. Pople, Chem. Phys. Lett. 66, 217 (1972)), contained in the SPARTAN molecular orbital program package, and IBM workstation and XP operating system (SPARTAN is a product of Wavefunction, Inc., 18401 Von Karman Avenue, Suite 370, Irvine, Calif. 92715; Spartan '04 Mechanics Program: (P6/X86); Spartan '04 Properties rogram (P6/X86)).

For example a HOMO calculation for N-vinylpyrrolidinone (60 electrons) provided the following results: a) the HOMO is molecular orbital (MO) #30; b) the corresponding eigenvalues of −0.21963 au and −5.97645 eV, are the HOMO energy in atomic units (au) and electron volts (eV), respectively (note: 1 au=27.21 eV, and thus, −0.21963 au=−5.97645 eV).

Various potential coagents, include, but are not limited to, those shown in Tables 1 and 2. Coagent materials with a second functionality, such as a carboxylic acid or amine, in addition to the unsaturated group, are listed in Table 2.

TABLE 1

Coagents with Single or Double Donating Groups

| | HOMO Calculation |
|---|---|
| Vinylene carbonate | −6.94 eV |
| 4-Vinylpyridine | −6.73 eV |
| 2-Vinylpyridine | −6.28 eV |
| 1-Vinylimidazole | −6.19 eV |
| 4-(Vinyloxy)butyl benzoate | −6.18 eV |
| 4-(Vinyloxy)butyl stearate | −6.18 eV |
| α-Methylstyrene | −6.02 eV |
| N-Vinylpyrrolidinone | −5.98 eV |
| 1,1-Diphenylethylene | −5.91 eV |
| N-Vinylcaprolactam | −5.86 eV |
| trans-Stilbene | −5.51 eV |
| 9-Vinylcarbazole | −5.40 eV |
| Indole | −5.40 eV |
| N-Methylindole | −5.29 eV |
| Phenyl vinyl ether | −5.94 eV |

TABLE 1-continued

Coagents with Single or Double Donating Groups

| | HOMO Calculation |
|---|---|
| 2-Vinylimidazole | −5.74 eV |
| 2-Vinylfuran | −5.6 eV |
| 4-Vinylimidazole | −5.57 eV |
| Vinylene dioxolane | −5.59 eV |
| 1,3-diethenylimidazolidinone | −5.53 eV |
| 1,1-dimethoxyethylene | −5.40 eV |
| 2-Vinylpyrrole | −5.13 eV |
| 2-Vinyl-1-alkylpyrrole | −5.05 eV |
| 1,2-Difurylethylene | −5.00 eV |
| Styrylpyrrole | −4.97 eV |
| N-Alkylvinylamine | −4.89 eV |
| 2,5-Divinyl-1-alkylpyrrole | −4.86 eV |
| 1,1-Di-N-methylpyrrolyethylene | −4.34 eV |

TABLE 2

Single-system Graftable Coagents with Functionality Inherent in Coagent

| | HOMO Calculation |
|---|---|
| Furfurylacrylic acid | −6.08 eV |
| 2-Vinylimidazole | −5.74 eV |
| 4-Vinylimidazole | −5.57 eV |
| 3-Indoleacrylic acid | −5.55 eV |
| 5-Vinylimidazole | −5.74 eV |
| Indole | −5.40 eV |
| Vinylpyrrole | −5.13 eV |
| N-Alkylvinylamine | −4.89 eV |

Double-donating coagents, for example, unsaturated molecules with two donating groups at the 1 and 2 positions of the unsaturation, offer additional resonance stabilization, and should result in less polypropylene degradation. Examples of such double-donating coagents, include, but are not limited to, trans-stilbene, 1,1-diphenylethylene, and 2-styryl-N-methylpyrrole.

Functionalized coagents have the ability to stabilize the polypropylene macroradical, and also contain an additional polar functionality, like carboxylic acid, amine, anhydride, and the like. The presence of the polar functionality eliminates the need for a third grafting component, like maleic anhydride. Examples of such coagents include, but are not limited to, 3-(2-furyl)acrylic acid, trans-3-indoleacrylic acid, and indole.

Applicants have discovered that an effective coagent has a highest occupied molecular orbital (HOMO) energy level greater than −8 eV, preferably greater than −7 eV, and more preferably greater than −6 eV. Applicants have also discovered that the theoretical yield of radicals from a peroxide, relative to the amount of coagent utilized, is also important in determining the amount of coagent required to minimize polymer scissioning, while maintaining or improving the level of grafting. In a preferred embodiment, the molar ratio of the "coagent(s)" to "free radicals formed from the peroxide(s)" is from 0.5:1 to 5:1, and more preferably from 1:1 to 5:1;

In one embodiment, the coagent has a substituted carbon-carbon double bond structure selected from the group consisting of structures (I), (II), (III), (IV) and (V) as follows, including cis and tans isomers:

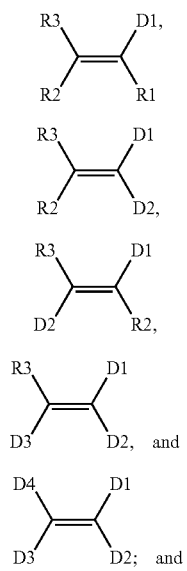

wherein D1, D2, D3 and D4 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1, R2 and R3 are each, independently, H, a hydrocarbon substituent, or a substituted hydrocarbon substituent; and wherein R1, R2 and R3, each, independently, does not have the same chemical structure as D1, D2, D3 or D4; and wherein the molar ratio of the molar ratio of the "coagent" to "free radicals formed from the peroxide" is from 0.5:1 to 5:1, and preferably from 1:1 to 5:1; and wherein the coagent selected from structures (I)-(V) does not contain only one phenyl group, or does not contain only one furanyl group.

In one embodiment, R1, R2 and R3 are each, independently, H or a C1-C20, or a C1-C10, or a C1-C8, or a C1-C6 hydrocarbyl radical, which is linear or branched. In another embodiment, R1, R2 and R3 are each, independently, H.

In another embodiment, R1, R2 and R3 are each, independently H or a linear —$(CH_2)_n$—$CH_3$, where n is greater than, or equal to 1, and preferably n is from 1 to 9, more preferably from 1 to 7, and even more preferably from 1 to 5.

In another embodiment, R1, R2 and R3 are each, independently H or —$CH_3$, —$CH_2CH_3$, —$CH_2CH_2CH_3$, —$CH_2CH_2CH_2CH_3$, —$CH(CH_3)CH_3$, —$CH(CH_3)CH_2CH_3$, —$CH_2CH(CH_3)CH_3$, —$CH(CH_3)CH_2CH_2CH_3$, —$CH_2CH(CH_3)CH_2CH_3$, and —$CH_2CH_2CH(CH_3)CH_3$. In another embodiment, R1, R2 and R3 are each, independently H or —$CH_3$.

In another embodiment, each structure, I, II, III, IV, and V, does not contain only one phenyl group (—$C_6H_5$) bonded to the carbon double bond.

In another embodiment, the coagent has a substituted carbon-carbon double bond structure, selected from the group consisting of the following:

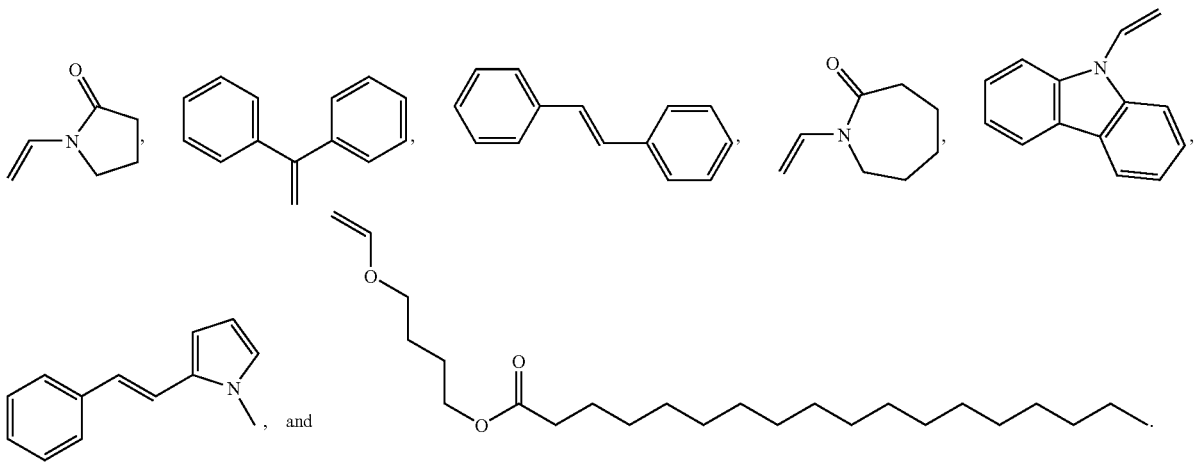

In another embodiment, the coagent has the structure (VI) as follows:

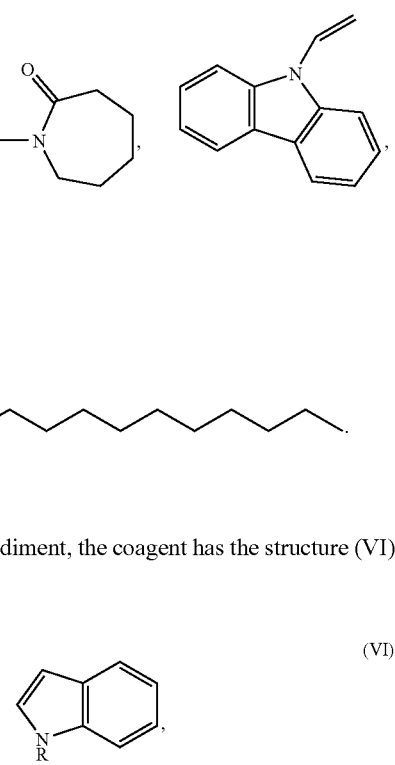

(VI)

wherein R is H, a hydrocarbon substituent, or a substituted hydrocarbon substituent.

In a further embodiment, R is H or a C1-C20, preferably a C1-C10, and more preferably a C1-C8, and even more preferably a C1-C6 hydrocarbyl radical, which is linear or branched.

In another embodiment, R is H or a linear —(CH$_2$)$_n$—CH$_3$, where n is greater than, or equal to 1, and preferably n is from 1 to 9, more preferably from 1 to 7, and even more preferably from 1 to 5.

In another embodiment, R is H or —CH$_3$, —CH$_2$CH$_3$, —CH$_2$CH$_2$CH$_3$, —CH$_2$CH$_2$CH$_2$CH$_3$, —CH(CH$_3$)CH$_3$, —CH(CH$_3$)CH$_2$CH$_3$, —CH$_2$CH(CH$_3$)CH$_3$, —CH(CH$_3$)CH$_2$CH$_2$CH$_3$, —CH$_2$CH(CH$_3$)CH$_2$CH$_3$, and —CH$_2$CH$_2$CH(CH$_3$)CH$_3$.

In another embodiment, R is H or —CH$_3$. In another embodiment, R is H.

In a further embodiment, the molar ratio of the "coagent" to "free radicals formed from the peroxide" is from 0.5:1 to 5:1, and preferably from 1:1 to 5:1.

In another embodiment, the coagent has a substituted carbon-carbon double bond structure selected from the group consisting of structures (VII) and (VIII) as follows:

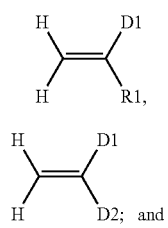

(VII)

(VIII); and wherein D1 and D2 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1 is H, a hydrocarbon substituent, or a substituted hydrocarbon substituent, and wherein R1 does not have the same chemical structure as D1 or D2.

In a further embodiment, R1 is H or a C1-C20, preferably a C1-C10, and more preferably a C1-C8, and even more preferably a C1-C6 hydrocarbyl radical, which is linear or branched. In another embodiment, R1 is hydrogen.

In another embodiment, R1 is H or a linear —(CH$_2$)$_n$—CH$_3$, where n is greater than, or equal to 1, and preferably n is from 1 to 9, more preferably from 1 to 7, and even more preferably from 1 to 5.

In another embodiment, R1 is H or —CH$_3$, —CH$_2$CH$_3$, —CH$_2$CH$_2$CH$_3$, —CH$_2$CH$_2$CH$_2$CH$_3$, —CH(CH$_3$)CH$_3$, —CH(CH$_3$)CH$_2$CH$_3$, —CH$_2$CH(CH$_3$)CH$_3$, —CH(CH$_3$)CH$_2$CH$_2$CH$_3$, —CH$_2$CH(CH$_3$)CH$_2$CH$_3$, and —CH$_2$CH$_2$CH(CH$_3$)CH$_3$. In another embodiment, R1 is H or —CH$_3$. In another embodiment, R1 is H.

In another embodiment, each structure, VII, and VIII, does not contain only one phenyl group (—C$_6$H$_5$) bonded to the carbon double bond.

In another embodiment, the coagent has a substituted carbon-carbon double bond structure selected from the group consisting of structures (IX), (X), (XI), (XII) and (XIII) as follows:

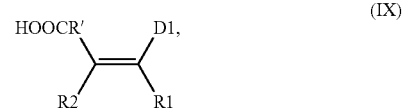

(IX)

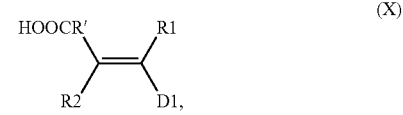

(X)

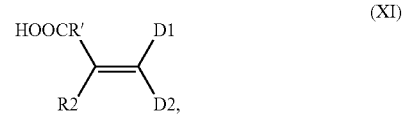

(XI)

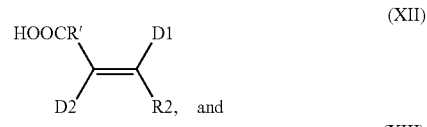

(XII)

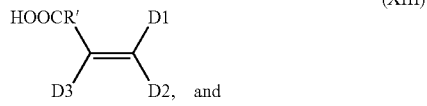

(XIII)

wherein D1, D2 and D3 are each, independently, one of the following: (a) a hydrocarbon substituent containing a heteroatom with a nonbonding pair of electrons, and where the heteroatom with the nonbonding pair is directly attached to the carbon-carbon double bond, or (b) a hydrocarbon substituent containing a carbon-carbon pi bonding pair, and where the first carbon of the carbon-carbon pi bonding pair is directly bonded to the carbon-carbon double bond; and wherein the R1 and R2 are each, independently, H, a hydrocarbon substituent, or a substituted hydrocarbon substituent, and wherein R' is a hydrocarbon group, a substituted hydrocarbon group, or R'COOH is COOH (R' is nil); and wherein R1 and R2, each, independently, does not have the same chemical structure as D1, D2, or D3; and wherein R'COOH does not have the same chemical structure as D1, D2, D3, R1 or R2.

In one embodiment, R' is a —(CH$_2$)$_n$— group, where n=0 to 5, and preferably n=0 to 3. In another embodiment, R' is an alkyl group or a substituted alkyl group. In another embodiment, R'COOH is COOH (R' is nil).

In another embodiment, R1 and R2 are each, independently, H or a C1-C20, preferably a C1-C10, and more preferably a C1-C8, and even more preferably a C1-C6 hydrocarbyl radical, which is linear or branched.

In another embodiment, R1 and R2 are each, independently H or a linear —(CH$_2$)$_n$—CH$_3$, where n is greater than, or equal to 1, and preferably n is from 1 to 9, more preferably from 1 to 7, and even more preferably from 1 to 5.

In another embodiment, R1 and R2 are each, independently, H or —CH$_3$, —CH$_2$CH$_3$, —CH$_2$CH$_2$CH$_3$, —CH$_2$CH$_2$CH$_2$CH$_3$, —CH(CH$_3$)CH$_3$, —CH(CH$_3$)CH$_2$CH$_3$, —CH$_2$CH(CH$_3$)CH$_3$, —CH(CH$_3$)CH$_2$CH$_2$CH$_3$, —CH$_2$CH(CH$_3$)CH$_2$CH$_3$, and —CH$_2$CH$_2$CH(CH$_3$)CH$_3$. another embodiment, R1 and R2 are each, independently, H or —CH$_3$. In another embodiment, R1 and R2 are each hydrogen.

Propylene-Based Polymers

Suitable propylene-based polymers include propylene homopolymers, propylene interpolymers. The polypropylene homopolymer can be isotactic, syndiotactic or atactic polypropylene. The propylene interpolymer can be a random or block copolymer, or a propylene-based terpolymer. Reactor copolymers of polypropylene may also be used.

Suitable comonomers for polymerizing with propylene include ethylene, 1-butene, 1-pentene, 1-hexene, 1-heptene, 1-octene, 1-nonene, 1-decene, 1-undecene, 1-dodecene, as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene, and more preferably ethylene.

Optionally, the propylene-based polymer may comprise monomers having at least two double bonds, which are preferably dienes or trienes. Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5-heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-butadiene, 1,3-pentadiene, norbornadiene, and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

The propylene interpolymers of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene, and preferably propylene/ethylene interpolymer. Suitable polypropylenes are formed by means within the skill in the art, for example, using single site catalysts (metallocene or constrained geometry) or Ziegler Natta catalysts. The propylene and optional comonomers, such as ethylene, or alpha-olefin monomers, are polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98. Polypropylene polymers include Shell's KF 6100 homopolymer polypropylene; Solvay's KS 4005 polypropylene copolymer; Solvay's KS 300 polypropylene terpolymer; and INSPIRE™ polypropylene resins available from The Dow Chemical Company. Additional propylene-based interpolymers include those described in U.S. Provisional Application No. 60/988,999 (filed Nov. 19, 2007), fulling incorporated herein.

Propylene/α-olefin interpolymers, containing greater than 50 mole percent (based on total moles of polymerizable monomers) polymerized propylene, fall within the invention. Suitable polypropylene base polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), VESTOPLAST™ polymers (Degussa), PROFAX PF-611 AND PROFAX PF-814 (Montell).

In a preferred embodiment, the propylene-based polymers comprise propylene, and typically, ethylene, and/or one or more unsaturated comonomers, and are characterized as having at least one, preferably more than one, of the following properties: (i) 13C NMR peaks corresponding to a regio-error at about 14.6 and about 15.7 ppm, the peaks of about equal intensity, (ii) a skewness index, Six, greater than about −1.20, (iii) a DSC curve with a $T_{me}$ that remains essentially the same, and a $T_{Max}$ that decreases as the amount of comonomer (i.e., units derived from ethylene and/or the unsaturated comonomer(s)) in the interpolymer is increased, and (iv) an X-ray diffraction pattern that reports more gamma-form crystals than a comparable interpolymer prepared with a Ziegler-Natta catalyst. Preferably the propylene-based interpolymer is a propylene/ethylene interpolymer. Especially preferred propylene-based polymers are the VERSIFY™ polymers available from The Dow Chemical Company. It is noted that in property (i), the distance between the two 13C NMR peaks is 1.1 ppm. This distance should be fairly constant. These propylene-based interpolymers are made using a nonmetallocene, metal-centered, heteroaryl ligand catalyst. Typically the interpolymers of this embodiment are characterized by at least one, preferably at least two, more preferably at least three, and even more preferably all four, of these properties.

With respect to the X-ray property of subparagraph (iv) above, a "comparable" interpolymer is one having the same monomer composition within 10 weight percent, and the same Mw (weight average molecular weight) within 10 weight percent. For example, if an inventive propylene/ethylene/1-hexene interpolymer is 9 weight percent ethylene and 1 weight percent 1-hexene, and has a Mw of 250,000, then a comparable polymer would have from 8.1 to 9.9 weight percent ethylene, from 0.9 to 1.1 weight percent 1-hexene, and a Mw from 225,000 to 275,000, and prepared with a Ziegler-Natta catalyst.

The propylene-based interpolymers of this invention typically comprise units derived from propylene, in an amount of at least about 60, preferably at least about 80 and more preferably at least about 85, weight percent of the interpolymer (based on total weight of polymerizable monomers). The typical amount of units derived from ethylene in propylene/ethylene interpolymers is at least about 0.1, preferably at least about 1 and more preferably at least about 5 weight percent, and the maximum amount of units derived from ethylene present in these interpolymers is typically not in excess of about 35, preferably not in excess of about 20 and more preferably not in excess of about 10, weight percent of the interpolymer (based on total weight of polymerizable monomers). The amount of units derived from additional unsaturated comonomer(s), if present, is typically at least about 0.01, preferably at least about 1, and more preferably at least about 5, weight percent, and the typical maximum amount of units derived from the additional unsaturated comonomer(s) typically does not exceed about 35, preferably it does not exceed about 30 and more preferably it does not exceed about 20, weight percent of the interpolymer (based on total weight of polymerizable monomers). The combined total of units derived from ethylene and any unsaturated comonomer typically does not exceed about 40, preferably it does not exceed about 30 and more preferably it does not exceed about 20, weight percent of the interpolymer (based on the total weight of polymerizable monomers).

In a preferred embodiment, the propylene-based interpolymer is an interpolymer of propylene, ethylene and, optionally, one or more unsaturated comonomers, for example, C4-C20 α-olefins, C4-C20 dienes, and vinyl aromatic compounds (example, styrene). These interpolymers are characterized as comprising at least about 60 weight percent of units derived from propylene, from 0.1 to 35 weight percent of units derived from ethylene, and from 0 to 35 weight percent of units derived from one or more unsaturated comonomers, with the proviso that the combined weight percent of units derived from ethylene and the unsaturated comonomer(s) does not exceed about 40 weight percent (based on total weight of polymerizable monomers).

In another embodiment, propylene-based interpolymer comprises units derived from propylene and one or more unsaturated comonomers. These interpolymers are characterized in having at least about 60 weight percent of the units derived from propylene, and from 0.1 to 40 weight percent of the units derived from the unsaturated comonomer(s). Weight percentages are based on total weight of polymerizable monomers.

The unsaturated comonomers used in the practice of this invention include, C4-C20 α-olefins, especially C4-C12 α-olefins such as 1-butene, 1-pentene, 1-hexene, 4-methyl-1-pentene, 1-heptene, 1-octene, 1-decene, 1-dodecene and the like; C4-C20 diolefins, preferably 1,3-butadiene, 1,3-pentadiene, norbornadiene, 5-ethylidene-2-norbornene (ENB) and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

In one embodiment, the propylene-based interpolymer has a melt flow rate (MFR) greater than, or equal to, 0.1, preferably greater than, or equal to 0.2, more preferably greater than, or equal to 0.5 g/10 min. In another embodiment, the propylene-based interpolymer has a melt flow rate (MFR) less than, or equal to, 100, preferably less than, or equal to 50, more preferably less than, or equal to 20 g/10 min. The MFR is measured according to ASTM D-1238 (2.16 kg, 230° C.). In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 10 weight percent, based on the total weight of polymerizable monomers.

In another embodiment, the propylene-based interpolymer has a melt flow rate (MFR) from 0.1 to 100 g/10 min, preferably from 0.5 to 50 g/10 min, and more preferably from 1 to 10 g/10 min. All individual values and subranges from 0.1 to 100 g/10 min, are included herein and disclosed herein. The MFR is measured according to ASTM D-1238 (2.16 kg, 230° C.). In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

In another embodiment, the propylene-based interpolymer has a density less than, or equal to, 0.90 g/cc, preferably less than, or equal to, 0.89 g/cc, and more preferably less than, or equal to, 0.88 g/cc. In another embodiment, the propylene-based interpolymer has a density greater than, or equal to, 0.83 g/cc, preferably greater than, or equal to, 0.84 g/cc, and more preferably greater than, or equal to, 0.85 g/cc. In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

In another embodiment, the propylene-based interpolymer has a density from 0.83 g/cc to 0.90 g/cc, and preferably from 0.84 g/cc to 0.89 g/cc, and more preferably from 0.85 g/cc to 0.88 g/cc. All individual values and subranges from 0.83 g/cc to 0.90 g/cc, are included herein and disclosed herein. In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

In another embodiment, the propylene-based interpolymer has a molecular weight distribution less than, or equal to, 6, and preferably less than, or equal to, 5.5, and more preferably less than, or equal to 5. In another embodiment, the molecular weight distribution is greater than, or equal to, 1.5, preferably greater than, or equal to, 2, more preferably greater than, or equal to 2.5. In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

In another embodiment, the propylene-based interpolymer has a molecular weight distribution from 1.5 to 6, and more preferably from 2.5 to 5.5, and more preferably from 3 to 5. All individual values and subranges from 1.5 to 6 are included herein and disclosed herein. In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

As discussed above, the propylene-based interpolymers may be made using a metal-centered, heteroaryl ligand catalyst, in combination with one or more activators, for example, an alumoxane. In certain embodiments, the metal is one or more of hafnium and/or zirconium. More specifically, in certain embodiments of the catalyst, the use of a hafnium metal has been found to be preferred, as compared to a zirconium metal, for heteroaryl ligand catalysts. The catalysts, in certain embodiments, are compositions comprising the ligand and metal precursor, and, optionally, may additionally include an activator, combination of activators, or activator package.

The catalysts used to make the propylene-based interpolymers additionally include catalysts comprising ancillary ligand-hafnium complexes, ancillary ligand-zirconium complexes and optionally activators, which catalyze polymerization and copolymerization reactions, particularly with monomers that are olefins, diolefins or other unsaturated compounds. Zirconium complexes, hafnium complexes, compositions or compounds can be used. The metal-ligand complexes may be in a neutral or charged state. The ligand to metal ratio may also vary, the exact ratio being dependent on the nature of the ligand and metal-ligand complex. The metal-ligand complex or complexes may take different forms, for example, they may be monomeric, dimeric, or of an even higher order. Suitable catalyst structures and associated ligands are described in U.S. Pat. No. 6,919,407, column 16, line 6 to column 41, line 23, which is incorporated herein by reference.

In a further embodiment, the propylene-based polymer comprises at least 50 weight percent propylene (based on the total amount of polymerizable monomers) and at least 5 weight percent ethylene (based on the total amount of polymerizable monomer), and has 13C NMR peaks, corresponding to a region error, at about 14.6 and 15.7 ppm, and the peaks are of about equal intensity (for example, see U.S. Pat. No. 6,919,407, column 12, line 64 to column 15, line 51).

The propylene-based interpolymers can be made by any convenient process. In one embodiment, the process reagents, that is, (i) propylene, (ii) ethylene and/or one or more unsaturated comonomers, (iii) catalyst, and, (iv) optionally, solvent and/or a molecular weight regulator (e.g., hydrogen), are fed to a single reaction vessel of any suitable design, for example, stirred tank, loop, or fluidized-bed. The process reagents are contacted within the reaction vessel under appropriate conditions (for example, solution, slurry, gas phase, suspension, high pressure) to form the desired polymer, and then the output of the reactor is recovered for post-reaction processing. All of the output from the reactor can be recovered at one time (as in the case of a single pass or batch reactor), or it can be recovered in the form of a bleed stream, which forms only a part, typically a minor part, of the reaction mass (as in the case of a continuous process reactor, in which an output stream is bled from the reactor, at the same rate at which reagents are added to maintain the polymerization at steady-state conditions).

"Reaction mass" means the contents within a reactor, typically during, or subsequent to, polymerization. The reaction mass includes reactants, solvent (if any), catalyst, and products and by-products. The recovered solvent and unreacted monomers can be recycled back to the reaction vessel. Suitable polymerization conditions are described in U.S. Pat. No. 6,919,407, column 41, line 23 to column 45, line 43, incorporated herein by reference.

The propylene-based polymers may have a combination of two or more suitable embodiments as described herein.

The propylene/α-olefin interpolymers may have a combination of two or more suitable embodiments as described herein.

The propylene/ethylene interpolymers may have a combination of two or more suitable embodiments as described herein.

Peroxides for Initiating Grafting Reactions

There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides. Some of the more preferable initiators, commonly used to modify the structure of polymers, are listed below. Also shown below, are the respective chemical structures and the theoretical radical yields. The theoretical radical yield is the theoretical number of free radicals that are generated per mole of initiator. For peroxide, this value is two radicals per peroxide functional group.

| Initiator Name | Initiator Structure | Theoretical Radical Yield |
| --- | --- | --- |
| Benzoyl peroxide | $C_6H_5-C(O)-O-O-C(O)-C_6H_5$ | 2 |
| Lauroyl peroxide | $CH_3(CH_2)_{10}C(O)-O-O-C(O)(CH_2)_{10}CH_3$ | 2 |
| Dicumyl peroxide | $C_6H_5-C(CH_3)_2-O-O-C(CH_3)_2-C_6H_5$ | 2 |
| Di-t-butyl peroxide | $H_3C-C(CH_3)_2-O-O-C(CH_3)_2-CH_3$ | 2 |
| Di-t-amyl peroxide | $H_3CH_2C-C(CH_3)_2-O-O-C(CH_3)_2-CH_2CH_3$ | 2 |
| t-Butyl peroxybenzoate | $C_6H_5-C(O)-O-O-C(CH_3)_3$ | 2 |

| Initiator Name | Initiator Structure | Theoretical Radical Yield |
|---|---|---|
| t-Amyl peroxybenzoate | C6H5-C(=O)-O-O-C(CH3)(CH2CH3)CH3 | 2 |
| 1,1-Bis(t-butylperoxy)-3,3,5-trimethylcyclohexane | 3,3,5-trimethylcyclohexane with two O-O-C(CH3)3 groups at 1-position | 4 |
| α,α'-Bis(t-butylperoxy)-1,3-diisopropylbenzene | (H3C)3C-O-O-C(CH3)2-[1,3-C6H4]-C(CH3)2-O-O-C(CH3)3 | 4 |
| α,α'-Bis(t-butylperoxy)-1,4-diisopropylbenzene | H3C-C(CH3)2-O-O-C(CH3)2-[1,4-C6H4]-C(CH3)2-O-O-C(CH3)2-CH3 | 4 |
| 2,5-Bis(t-butylperoxy)-2,5-dimethylhexane | H3C-C(CH3)2-O-O-C(CH3)2-CH2CH2-C(CH3)2-O-O-C(CH3)2-CH3 | 4 |
| 2,5-Bis(t-butylperoxy)-2,5-dimethyl-3-hexyne | H3C-C(CH3)2-O-O-C(CH3)2-C≡C-C(CH3)2-O-O-C(CH3)2-CH3 | 4 |

Grafting Agents (MAH and Others)

Grafting agents include, but are not limited to, maleic anhydride and other anhydride containing and acid containing compounds, as well as compounds containing other functional groups, such as amine, imide, and the like. Grafting agents are reacted with the propylene-based polymer to introduce functionality onto the polymer.

The approach of radical functionalization of propylene-based polymers in the presence of at least one coagent may be extended to other radically graftable species beyond maleic anhydride and its derivatives, which could be other acid functionalities or other polar or reactive functionalities. Other functional agents or monomers include methacrylic acid, acrylic acid, glycidyl methacrylate, acrylamide, vinyltrialkoxysilanes, and the like.

A preferred embodiment of the invention provides propylene-based polymers grafted with maleic anhydride. The maleic anhydride grafted propylene-based polymer may or may not contain small amounts of hydrolysis product and/or other derivatives.

In another embodiment, the amount of maleic anhydride used in the grafting reaction is less than, or equal to, 10 phr (parts per hundred, based on the weight of the propylene-based polymer), preferably less than 5 phr, and more preferably from 0.5 to 10 phr, and even more preferably from 0.5 to 5 phr. All individual values and subranges from 0.05 phr to 10 phr are included herein and disclosed herein.

In another embodiment, the amount of initiator used in the grafting reaction is less than, or equal to, 20 millimoles radicals per 100 grams propylene-based polymer, preferably, less than, or equal to, 6 millimoles radicals per 100 grams propylene-based polymer, and more preferably, less than, or equal to, 3 millimoles radicals per 100 grams propylene-based polymer. All individual values and subranges from 0.01 millimoles to 20 millimoles radicals per 100 grams propylene-based polymer are included herein and disclosed herein.

In another embodiment, the amount of "maleic anhydride constituent" grafted on the polyolefin chain is greater than 0.05 weight percent (based on the weight of the propylene-based polymer), as determined by titration analysis, FTIR analysis, or any other appropriate method. In a further embodiment, this amount is greater than 0.25 weight percent, and in yet a further embodiment, this amount is greater than 0.5 weight percent. In a preferred embodiment, 0.25 weight percent to 2.0 weight percent of maleic anhydride is grafted. All individual values and subranges greater than 0.05 weight percent are considered within the scope of this invention, and are disclosed herein.

The maleic anhydride, as well as many other unsaturated heteroatom containing species, may be grafted to the polymer by any conventional method, in the presence of the peroxide. As discussed above, peroxides include dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butylperoxy)hexane, 2,5-dimethyl-2,5-di(tert-butylperoxy)-3-hexyne, lauroyl peroxide, and tert-butyl peracetate. One skilled in the art may select the appropriate peroxide as needed for the grafting conditions.

The grafting reaction should be performed under conditions that maximize grafts onto the polymer backbone, and minimize side reactions, such as the homopolymerization of the grafting agent, which is not grafted to the propylene-based polymer, or the copolymerization of grafting agent and coagents which are not grafted to the propylene-based polymer. It is not unusual that some fraction of the maleic anhydride (and/or its derivatives) does not graft onto the propylene-based polymer, and it is generally desired that the unreacted grafting agent be minimized. The grafting reaction is preferably performed in the melt. The maleation may be performed in a wide-variety of equipments, such as, but not limited to, twin screw extruders, single screw extruders, Brabenders, and the like.

Additional embodiments of the invention provide for propylene-based polymers grafted with other carbonyl-containing compounds. In one embodiment, these grafted propylene-based polymers may have molecular weight distributions and/or densities the same as, or similar to, those described above for the grafted maleic anhydride propylene-based polymers. In another embodiment, these grafted propylene-based polymers are prepared using the same or similar amounts of grafting compound and peroxide as those used for the grafted maleic anhydride propylene-based polymers, as described above. In another embodiment, these grafted propylene-based polymers contain the same or similar levels of grafted compound as for the grafted maleic anhydride, as described above.

Additional carbonyl-containing compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

Compositions

In one embodiment, the composition comprises a propylene-based polymer, a peroxide, a grafting agent and a coagent.

In another embodiment, the composition comprises a propylene-based polymer, a peroxide, and a coagent.

In another embodiment, the molar ratio of the coagent to radicals (theoretical yield) generated from the peroxide is from 0.5:1 to 5:1 preferably from 1:1 to 5:1, and more preferably from 1:1 to 3:1.

In another embodiment, the molar ratio of the grafting agent to radicals (theoretical yield) generated from the peroxide is from 1 to 30, and preferably from 2 to 20.

In another embodiment, the molar ratio of the grafting agent to coagent is from 1 to 30, and preferably from 2 to 20.

Typically, the inventive compositions contain one or more stabilizers, for example, antioxidants, such as Irganox™ 1010 and Irgafos™ 168, both supplied by Ciba Specialty Chemicals. Polymers are typically treated with one or more stabilizers before an extrusion or other melt processes. Other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents.

An inventive composition may comprise a combination of two or more suitable embodiments as described herein.

Functionalization Reactions

The invention also provides a process for forming a functionalized propylene-based polymer, said process comprising melt blending an inventive composition. Melt functionalization, for example a maleation, is desired due to the speed of the process, in addition to the common availability of melt mixing devices.

In a preferred embodiment, the functionalization reaction takes place in an extruder. In another embodiment, the reaction takes place in a Brabender mixer, a Busch mixer or a Farrel mixer.

In another embodiment, the functionalization reaction takes place in a batch mixer. In a further embodiment, the batch mixer is of commercial dimensions. In another embodiment, the batch mixer is of lab scale or pilot plant dimensions.

In another embodiment, the functionalization reaction is a solid state reaction.

Functionalization reaction and process conditions, such as temperature(s) and pressure(s), order of addition of components, method, and rate of addition of components, can be determined by those skilled in the art.

In another embodiment, the at least one coagent and the at least one grafting agent are both imbibed into the at least one propylene-based polymer before the composition is melt reacted. In a further embodiment, the composition is in the form of a dry blend during the imbibing process. In another embodiment, the imbibing takes place at room temperature.

In another embodiment, the propylene-based polymer is added to an extruder before the grafting agent and coagent. In another embodiment, the grafting agent is added to the extruder before the coagent.

Applications

The invention also relates to methods of using these functionalized polymers in applications requiring unique combinations of processing elements and unique physical properties in the final product. The invention also relates to articles, each comprising at least one component formed from an inventive composition, as discussed above. Articles include, but are not limited to, moldings, films, sheets, and foamed objects. These articles may be prepared by molding, extruding, or other processes. The functionalized polymers are useful in adhesives, tie layers, laminates, polymeric blends, and other end uses. The resulting products may be used in the manufacture of components for automobiles, such as profiles, bumpers and trim parts, or tires, or may be used in the manufacture of packaging materials, electric cable insulation, coatings, geomembranes, and other applications. Additional articles include compounding formulations, compatibilizers, adhesives, films, powder coatings, laminates, dispersions, paints, coatings, paper reinforcing agents, composites, fibers, fabrics, fillers and other conventional thermoplastic articles of manufacture.

Additional articles include elastic films and fibers; soft touch goods, such as tooth brush handles and appliance handles; gaskets and profiles; adhesives (including hot melt adhesives and pressure sensitive adhesives); footwear components (including shoe soles and shoe liners); auto interior parts and profiles; foam goods (both open and closed cell); impact modifiers for other thermoplastic polymers, such as high density polyethylene, isotactic polypropylene, or other olefin polymers; coated fabrics; hoses; tubing; weather stripping; cap liners; flooring; and viscosity index modifiers, also known as pour point modifiers, for lubricants.

The functionalized polymers are well suited for the preparation of the following: objects comprising at least one film layer, such as a monolayer film, or at least one layer in a multilayer film, such films prepared by cast, blown, calendered, or extrusion coating processes; molded articles, such as blow molded, injection molded, or rotomolded articles; extrusions; fibers; and woven or non-woven fabrics. The functionalized interpolymers can be used to improve pigment retention in pigmented articles.

Of particular utility are multi-component fibers, such as core/sheath fibers, having an outer surface layer, comprising, at least, in part, one or more functional polymers of the invention. Fibers that may be prepared from the present polymers or blends include staple fibers, tow, multicomponent, sheath/core, twisted, and monofilament. Suitable fiber forming processes include spinbonded, melt blown techniques, as disclosed in U.S. Pat. Nos. 4,430,563, 4,663,220, 4,668,566, and 4,322,027, each incorporated herein by reference, gel spun fibers as disclosed in U.S. Pat. No. 4,413,110, incorporated herein by reference, woven and nonwoven fabrics, as disclosed in U.S. Pat. No. 3,485,706, incorporated herein by reference, or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

The functionalized polymers described herein are also useful for wire and cable coating operations, as well as in sheet extrusion for vacuum forming operations, and forming molded articles, including the use of injection molding, blow molding, or rotomolding processes. Compositions comprising the olefin polymers can also be formed into fabricated articles, such as those previously mentioned, using conventional polyolefin processing techniques which are well known to those skilled in the art of polyolefin processing.

Dispersions (both aqueous and non-aqueous) can also be formed using the functionalized polymers or formulations comprising the same. Frothed foams comprising the invented functionalized interpolymers can also be formed, as disclosed in PCT Application No. 2004/027593, filed Aug. 25, 2004. The polymers may also be crosslinked by any known means, such as the use of peroxide, electron beam, silane, azide, or other cross-linking technique.

Applications—Compositions and Blends Containing the Functionalized Olefin Interpolymers Thermoplastic compositions comprising the present functionalized olefin polymers, may include blends with other natural or synthetic polymers, additives, reinforcing agents, ignition resistant additives, antioxidants, stabilizers, colorants, extenders, crosslinkers, blowing agents, and/or plasticizers.

Additives and adjuvants may be included in any formulation comprising the present polymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to the invention.

Compositions may contain processing oils, plasticizers, and processing aids. Rubber processing oils have a certain ASTM designation and paraffinic, napthenic or aromatic process oils are all suitable for use. Generally from 0 to 150 parts, more preferably 0 to 100 parts, and most preferably from 0 to 50 parts of oil per 100 parts of total polymer are employed. Additional processing aids include conventional waxes, fatty acid salts, such as calcium stearate or zinc stearate, (poly) alcohols including glycols, (poly)alcohol ethers, including glycol ethers, (poly)esters, including (poly)glycol esters, and metal salt-, especially Group 1 or 2 metal or zinc-, salt derivatives thereof.

It is known that non-hydrogenated rubbers, such as those comprising polymerized forms of butadiene or isoprene, including block copolymers (here-in-after diene rubbers), have lower resistance to UV, ozone, and oxidation, compared to mostly or highly saturated rubbers. In applications, such as tires made from compositions containing higher concentrations of diene based rubbers, it is known to incorporate carbon black to improve rubber stability, along with anti-ozone additives and anti-oxidants. Functionalized interpolymers of the invention that possess extremely low levels of unsaturation, find particular application as a protective surface layer (coated, coextruded or laminated) or weather resistant film adhered to articles formed from conventional diene elastomer modified polymeric compositions.

For conventional TPO, TPV, and TPE applications, carbon black is the additive of choice for UV absorption and stabilizing properties. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg, and average pore volumes ranging from 10 to 150 cm$^3$/100 g. Generally, smaller particle sized carbon blacks are employed, to the extent cost considerations permit.

Suitable polymers for blending with the functionalized propylene-based polymers of the invention, include thermoplastic and non-thermoplastic polymers, including natural and synthetic polymers. Exemplary polymers for blending include polypropylene, (both impact modifying polypropylene, isotactic polypropylene, atactic polypropylene, and random ethylene/propylene copolymers), various types of polyethylene (PE), including high pressure, free-radical Low Density Polyethylene (LDPE), Ziegler Natta Linear Low Density Polyethylene (LLDPE), metallocene PE, including multiple reactor PE ("in reactor" blends of Ziegler-Natta PE and metallocene PE, such as products disclosed in U.S. Pat. Nos. 6,545,088, 6,538,070, 6,566,446, 5,844,045, 5,869,575, and 6,448,341, ethylene-vinyl acetate (EVA), ethylene/vinyl alcohol copolymers, polystyrene, impact modified polystyrene, acrylonitrile-butadiene-styrene (ABS), styrene/butadiene block copolymers and hydrogenated derivatives thereof (SBS and SEBS), and thermoplastic polyurethanes. Homogeneous polymers, such as olefin plastomers and elastomers, ethylene and propylene-based copolymers (for example polymers available under the trade designation VERSIFY™, available from The Dow Chemical Company, and VISTAMAXX™, available from ExxonMobil, can also be useful as components in blends comprising the functionalized interpolymers.

Additional polymers for blending include, but are not limited to, polyamides, polyesters, polycarbonate, other engineering thermoplastics, polyvinyl alcohol, polyvinylidene chloride, polyvinyl chloride, and natural products, such as cellulose and wool fibers. Suitable polyamides include, but are not limited to, aliphatic polyamides, such as polycaprolactam (nylon 6), poly(hexamethylene adipamide) (nylon 6,6), poly(hexamethylene sebacamide); and aromatic polyamides (or polyaramides). Suitable polyesters include, but are not limited to, poly(ethylene terephthalate) (PET) and polybutylene terephthalate) (PBT). Thermoset systems such as epoxies, unsaturated polyesters, and the like, may have the functionalized multi-block polymers blended into them prior to curing or during the curing of the thermoset system.

In one embodiment, the invention provides thermoplastic compositions, comprising a thermoplastic matrix polymer, especially a polyamide, polyester or a polyolefin, such as polypropylene, and a dispersed phase, containing a core-shell or core-multiple shell morphology. The shell comprising a functionalized multi-block interpolymer according to the invention, and the core comprising the multi-block unfunctionalized interpolymer and/or other types of polyolefins.

The functionalized propylene-based polymer may also form inner core-shell type particles having hard crystalline or semi-crystalline blocks in the form of a "core," surrounded by soft or elastomeric blocks, forming a "shell" around the occluded domains of hard polymer. These particles may be formed and dispersed within the matrix polymer by the forces incurred during melt compounding or blending.

This desired core-shell or core-multiple shell morphologies may result from, or be enhanced by, chemical interactions between the functionalized moiety of the propylene-based polymer and the matrix resin. These chemical interactions may result in covalent bonds or noncovalent associations. For example, maleic anhydride grafts can form amide linkages with terminal amines of a polyamide, or form ester linkages with terminal hydroxyls of a polyester. The chemical interactions may also arise from enhanced associations between the functional groups of the functionalized propylene-based polymer and chemical moieties in the matrix polymer. Such associations include, but are not limited to, dipole-dipole interactions, hydrogen bonding, hydrophilic interactions and hydrophobic interactions.

Additional blends include thermoplastic polyolefin blends, thermoplastic elastomer blends, thermoplastic vulcanisites and styrenic polymer blends. Thermoplastic polyolefin blends and thermoplastic vulcanisites may be prepared by combining the functionalized propylene-based polymer, including unsaturated derivatives thereof, with an optional rubber, including conventional block copolymers, especially an SBS block copolymer, and optionally, a crosslinking or vulcanizing agent. The thermoplastic polyolefin blends are generally prepared by blending the functionalized propylene-based polymer with a polyolefin, and optionally a crosslinking or vulcanizing agent. The foregoing blends may be used in forming a molded object, and optionally crosslinking the resulting molded article. A similar procedure, using different components, has been previously disclosed in U.S. Pat. No. 6,797,779, incorporated herein by reference. Suitable conventional block copolymers desirably possess a Mooney viscosity ($ML_{1+4}$ @ 100° C.) in the range from 10 to 135, more preferably from 25 to 100, and most preferably from 30 to 80. Suitable polyolefins include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

Blends, as described herein, may be prepared by mixing or kneading the respective components at a temperature around, or above, the melt point temperature of one or both of the components. For some functionalized propylene-based polymers, this temperature may be above 90° C., most generally above 100° C., and most preferably above 110° C. Typical polymer mixing or kneading equipment, capable of reaching the desired temperatures and capable of melt plastifying the mixture, may be employed. These include mills, kneaders, extruders (both single screw and twin-screw), Banbury mixers, calenders, and the like. The sequence of mixing, and method, may depend on the final composition. A combination of Banbury batch mixers and continuous mixers may also be employed, such as a Banbury mixer, followed by a mill mixer, followed by an extruder.

The blend compositions may contain processing oils, plasticizers, and processing aids. Rubber processing oils have a certain ASTM designation, and paraffinic, napthenic or aromatic process oils are all suitable for use. Generally from 0 to 150 parts, more preferably 0 to 100 parts, and most preferably from 0 to 50 parts of oil per 100 parts of total polymer are employed. Additional processing aids include conventional waxes, fatty acid salts, such as calcium stearate or zinc stearate, (poly)alcohols including glycols, (poly)alcohol ethers, including glycol ethers, (poly)esters, including (poly)glycol esters, and metal salt-, especially Group 1 or 2 metal or zinc-, salt derivatives thereof.

Compositions, including thermoplastic blends according to the invention may also contain anti-ozonants or anti-oxidants that are known to a rubber chemist of ordinary skill. The anti-ozonants may be physical protectants, such as waxy materials that come to the surface and protect the part from oxygen or ozone, or they may be chemical protectors that react with oxygen or ozone. Suitable chemical protectors include styrenated phenols, butylated octylated phenol, butylated di(dimethylbenzyl) phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are Wingstay™ S antioxidant, Polystay™ 100 antioxidant, Polystay™ 100 AZ antioxidant, Polystay™ 200 antioxidant, Wingstay™ L antioxidant, Wingstay™ LHLS antioxidant, Wingstay™ K antioxidant, Wingstay™ 29 antioxidant, Wingstay™ SN-1 antioxidant, and Iranox™ antioxidants. In some applications, the anti-oxidants and anti-ozonants used, will preferably be non-staining and non-migratory.

For providing additional stability against UV radiation, hindered amine light stabilizers (HALS) and UV absorbers may be also used. Suitable examples include Tinuvin™ 123, Tinuvin™ 144, Tinuvin™ 622, Tinuvin™ 765, Tinuvin™ 770, and Tinuvin™ 780, available from Ciba Speciality Chemicals, and Chemisorb™ T944, available from Cytex Plastics, Houston Tex., USA. A Lewis acid may be additionally included with a HALS compound in order to achieve superior surface quality, as disclosed in U.S. Pat. No. 6,051,681.

For some compositions, an additional mixing process may be employed to pre-disperse the anti-oxidants, anti-ozonants, carbon black, UV absorbers, and/or light stabilizers, to form a masterbatch, and subsequently to form polymer blends therefrom.

Suitable crosslinking agents (also referred to as curing or vulcanizing agents), for use herein include sulfur based, peroxide based, or phenolic based compounds. Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729, all incorporated herein by reference.

When sulfur based curing agents are employed, accelerators and cure activators may be used as well. Accelerators are used to control the time and/or temperature required for dynamic vulcanization, and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5, phr, based on total composition weight. In another embodiment, combinations of a primary and a secondary accelerator might be used, with the secondary accelerator being used in smaller amounts, such as from about 0.05 to about 3 phr, in order to activate, and to improve the properties of the cured article. Combinations of accelerators generally produce articles having properties that are somewhat better than those produced by use of a single accelerator. In addition, delayed action accelerators may be used, which are not affected by normal processing temperatures, yet produce a satisfactory cure at ordinary vulcanization temperatures. Vulcanization retarders might also be used.

Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbarnate or thiuram compound. Certain processing aids and cure activators, such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents, used for partial or complete dynamic vulcanization, are known in the art, and disclosed for example in the publication, "Peroxide Vulcanization of Elastomer", Vol. 74, No 3, July-August 2001.

When the "functionalized propylene-based polymer" containing composition is at least partially crosslinked, the degree of crosslinking may be measured by dissolving the composition in a solvent for specified duration, and calculating the percent gel or unextractable component. The percent gel normally increases with increasing crosslinking levels. For cured articles according to the invention, the percent gel content is desirably in the range from 5 to 100 percent.

The functionalized propylene-based polymers of the invention, as well as blends thereof, may possess improved processability compared to prior art compositions, due to lower melt viscosity. Thus, the composition or blend may also from an improved surface appearance, especially when formed into a molded or extruded article. At the same time, the present compositions and blends thereof may also possess improved melt strength properties, thereby allowing the present functionalized multi-block copolymers and blends thereof, especially TPO blends, to be usefully employed in foam and thermoforming applications where melt strength is currently inadequate.

Thermoplastic compositions and thermoset compositions, each containing functionalized propylene-based polymer(s), according to the invention, may also contain organic or inorganic fillers, or other additives, such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titanias. Silane based coupling agents or other coupling agents may also be employed for better filler bonding.

The thermoplastic compositions of this invention, including the foregoing blends, may be processed by conventional molding techniques, such as injection molding, extrusion molding, thermoforming, slush molding, over molding, insert molding, blow molding, and other techniques. Films, including multi-layer films, may be produced by cast or tentering processes, including blown film processes.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The terms "functionalized propylene-based polymer," or "functionalized propylene/α-olefin interpolymer," and "functionalized propylene/ethylene interpolymer," and similar terms, as used herein, refer to the reaction product of a base polymer with one or more compounds, such as a grafting agent, peroxide and coagent.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer," as used herein, refers to a polymeric compound prepared by polymerizing monomers whether of the same or a different type. The generic term polymer thus embraces the term homopolymer, usually employed to refer to polymers prepared from only one type of monomer, and the term interpolymer as defined hereinafter. The terms "ethylene/α-olefin polymer" and "propylene/α-olefin polymer" are indicative of interpolymers as described below.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term, "ethylene-based polymer," as used herein, refers to a polymer that comprises more than 50 mole percent polymerized ethylene monomer (based on the total amount of polymer), and optionally may comprise at least one polymerized comonomer.

The term, "ethylene/α-olefin interpolymer," as used herein, refers to an interpolymer that comprises more than 50 mole percent polymerized ethylene monomer (based on the total amount of interpolymer), and at least one polymerized α-olefin.

The term, "propylene-based polymer," as used herein, refers to a polymer that comprises more than 50 mole percent polymerized propylene monomer (based on the total amount of polymer), and optionally may comprise at least one polymerized comonomer.

The term, "propylene/α-olefin interpolymer," as used herein, refers to an interpolymer that comprises more than 50 mole percent polymerized propylene monomer (based on the total amount of interpolymer), and at least one polymerized α-olefin.

The term, "propylene/ethylene interpolymer," as used herein, refers to an interpolymer that comprises more than 50 mole percent polymerized propylene monomer (based on the total amount of interpolymer), polymerized ethylene monomer (second predominant monomer), and, optionally, at least one polymerized one α-olefin.

The term "heteroatom" refers to an atom other than carbon or hydrogen. Preferred heteroatoms include: F, Cl, Br, N, O, P, B, S, Si, Sb, Al, Sn, As, Se and Ge.

The terms, "hydrocarbyl" and "hydrocarbon" refer to substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" and "substituted hydrocarbon" refer to a hydrocarbyl group that is substituted with one or more nonhydrocarbyl substituent groups. The terms, "heteroatom containing hydrocarbyl," "heterohydrocarbyl" and like terms refer to groups in which at least one atom other than hydrogen or carbon is present along with one or more carbon atom and one or more hydrogen atoms.

As used herein the term "aromatic" refers to a polyatomic, cyclic, conjugated ring system containing (4δ+2) π-electrons, wherein δ is an integer greater than or equal to 1. The term "fused" as used herein, with respect to a ring system containing two or more polyatomic, cyclic rings, means that with respect to at least two rings thereof, at least one pair of adjacent atoms is included in both rings. The term "aryl" refers to a monovalent aromatic substituent, which may be a single aromatic ring or multiple aromatic rings, which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms, bound to any carbon, is replaced by one or more functional groups, such as alkyl, substituted alkyl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and both saturated and unsaturated cyclic hydrocarbons, which are fused to the aromatic ring(s), linked covalently or linked to a common group, such as a methylene or ethylene moiety. The common linking group may also be a carbonyl, as in benzophenone, or oxygen, as in diphenylether, or nitrogen, as in diphenylamine.

The term phenyl refers to the following structure:

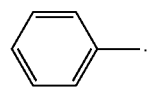

The term furyl refers to the following structure:

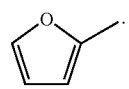

The term maleic anhydride refers to the following structure:

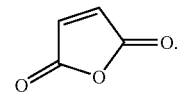

The term "grafted maleic anhydride" refers to a structure bonded to a polymer backbone, and which contains at least one chemical moiety as shown below, and may include hydrolyzed derivatives and other related structures:

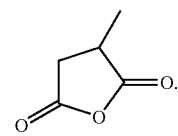

Test Methods

Density is determined in accordance with American Society for Testing and Materials (ASTM) procedure ASTM D792-00, Method B.

Melt flow rate (MFR) in g/10 min for propylene-based polymers is measured using ASTM D-1238-04 condition 230° C./2.16 kg. Melt index (I2) in g/10 min for ethylene-based polymers is measured using ASTM D-1238-04, Condition 190° C./2.16 kg.

Weight Percent Grafted Maleic Anhydride is determined via titration on products that have been dissolved in boiling xylene and re-precipitated in acetone in order to remove ungrafted maleic anhydride. The basic titration procedure for titration is described in U.S. Pat. No. 6,6884,850, incorporated herein by reference.

EXAMPLES

A. Materials

Maleic Anhydride Purification. Maleic anhydride (MAH), supplied by Aldrich Chemical, was vacuum sublimed at approximately 95° C. The sublimed product is maintained in a nitrogen atmosphere, prior to addition to the maleation reaction.

All other materials were used as received from supplier. VERSIFY™ PP2000.01, density of approximately 0.87-0.89 g/cc, melt flow rate (MFR)=1.6-2.5 g/10 min (230° C., 2.16 kg), propylene/ethylene copolymer (available from The Dow Chemical Company); ENGAGE™ 8200, density=0.867-0.873 g/cc, melt index (I2)=4-6 g/10 min (190° C., 2.16 kg) ethylene/octene copolymer (available from The Dow Chemical Company; 2,5-bis(tert.-butylperoxy)-2,5-dimethylhexane, 95.2% (Aldrich/ATOFINA, LUPEROX™ 101); 1,1-diphenylethylene (Aldrich); furylacrylic acid (Aldrich); indole (Aldrich); indoleacrylic acid (Aldrich); α-methylstyrene (Aldrich); trans-stilbene (Aldrich); N-vinylcaprolactam (Aldrich); 9-vinylcarbazole (Aldrich); 4-(vinyloxy)butyl stearate (Aldrich); 1-vinyl-2-pyrrolidinone (also called N-vinylpyrrolidinone) (Aldrich).

B. Grafting Reactions on VERSIFY™ PP2000.01—Representative Procedure

The propylene interpolymer was functionalized in a Haake Rheomix 600p mixer, equipped with roller rotors and a pneumatic ram. The three zones of the mixer were heated to 170° C., and the torque zeroed at 50 rpm. VERSIFY™ PP2000.01 (45.0 grams, 1.07 moles propylene) was added to the mixer at 10 rpm, and the mixer speed was increased stepwise over two minutes to 50 rpm. The polymer was fluxed for one minute, and then maleic anhydride was added. The resulting mixture was fluxed for two minutes, and the designated coagent was then added. The resulting mixture was mixed for one minute, and then the peroxide, LUPEROX™ 101, was injected via a weighed syringe. The resulting material was mixed for an additional 12.5 minutes, and then removed from the mixer. The melt flow rate (MFR, 230° C., 2.16 kg) was measured on material as removed from the mixer. Melt flow rates (MFR) on products, as removed from the Haake Rheomix, were used as the indicator of coagent success in stopping or reducing the degradation of the polymer.

For the control samples, where maleic anhydride was not added to the resin, but coagent and peroxide were added, the same mixing times were followed, with coagent and peroxide added at the same time in the reaction sequence, as described above.

Grafted polymer was titrated to determine the amount of grafted maleic anhydride. Prior to titration, each grafted polymer sample was dissolved and reprecipitated to remove ungrafted maleic anhydride. The sample (3 grams) was dissolved in approximately 70 mL of boiling xylenes, and the dissolved sample was precipitated in approximately 250 mL of stirred acetone. The fibrous product was collected by filtration, rinsed, soaked in fresh acetone, and dried to constant weight, in an approximately 50° C. vacuum oven. The typical recovered yield was 2.5-2.8 grams.

Table 3 provides the results for a control experiment, where no coagent was present in the maleation of the propylene/ethylene copolymer (PP2000.01) by LUPEROX™. Tables 4-13 describe the quantities and types of coagents used in the grafting experiments with MAH. The parameters "mol % coagent," "mmol R·/100 g," and "wt % MAH," in the succeeding tables are all based on the 45.0 gram charge of the propylene/ethylene copolymer. The parameter "mmol R·/100 g" refers to the theoretical yield of free radicals generated by the peroxide per 100 g of propylene/ethylene copolymer charged to the reaction. The parameter mmol R· refers to the total theoretical amount of free radicals generated by the peroxide in the experiment.

TABLE 3

Control - No Coagent

| Coagent | Coagent, g (mol %, mmol) | LUPEROX 101, g (mmol R·/100 g, mmol R·) | wt % MAH feed (g, mmol) | wt % MAH graft | Torque, Nm | MFR, g/10 min |
|---|---|---|---|---|---|---|
| NONE | 0 | 0.1193 (3.4. 1.55) | 3.0 (1.39, 14.2) | — | 0.6 | 100 |

TABLE 4

1-Vinyl-2-pyrrolidinone as Coagent in Maleic Anhydride Grafting on Propylene/Ethylene Copolymer

| Coagent | Coagent, g (mol %, mmol) | LUPEROX 101, g (mmol R·/100 g, mmol R·) | wt % MAH feed (mmol) | wt % MAH graft | Torque, Nm | MFR, g/10 min |
|---|---|---|---|---|---|---|
| 1-Vinyl-2-pyrrolidinone | 0.1748 (0.14, 1.57) | 0.1190 (3.3, 1.56) | none | Not applicable | — | >100 |
| 1-Vinyl-2-pyrrolidinone | 0.3486 (0.29, 3.14) | 0.2307 (6.6, 3.02) | none | Not applicable | 1.2 | >100 |
| 1-Vinyl-2-pyrrolidinone | 0.0885 (0.07, 0.77) | 0.1171 (3.3, 1.54) | 3.0 (14.2) | 0.32 | 2.1 | 20.1 |
| 1-Vinyl-2-pyrrlidinone | 0.1719 (0.14, 1.55) | 0.1174 (3.3, 1.54) | 1.0 (4.6) | 0.38 | 2.7 | 17.9 |
| 1-Vinyl-2-pyrrolidinone | 0.1716 (0.14, 1.54) | 0.1162 (3.3, 1.52) | 2.0 (9.4) | 0.45 | 4.4 | 7.5 |
| 1-Vinyl-2-pyrrolidinone | 0.1707 (0.14, 1.54) | 0.1196 (3.3, 1.57) | 3.0 (14.2) | 0.35 | 3.7 | 9.0 |
| 1-Vinyl-2-pyrrolidinone | 0.2559 (0.21, 2.03) | 0.1234 (3.3, 1.62) | 3.0 (14.2) | 0.25 | 4.1 | 8.4 |

TABLE 4-continued

1-Vinyl-2-pyrrolidinone as Coagent in Maleic Anhydride Grafting on Propylene/Ethylene Copolymer

| Coagent | Coagent, g (mol %, mmol) | LUPEROX 101, g (mmol R·/100 g, mmol R·) | wt % MAH feed (mmol) | wt % MAH graft | Torque, Nm | MFR, g/10 min |
|---|---|---|---|---|---|---|
| 1-Vinyl-2-pyrrolidinone | 0.3362 (0.28, 3.03) | 0.1144 (3.3, 1.50) | 3.0 (14.2) | 0.30 | 5.0 | 6.4 |
| 1-Vinyl-2-pyrrolidinone | 0.3316 (0.28, 2.98) | 0.2274 (6.6, 2.98) | 3.0 (14.2) | 0.45 | 2.2 | 15.0 |
| 1-Vinyl-2-pyrrolidinone | 0.6555 (0.56, 5.90) | 0.2299 (6.6, 3.01) | 3.0 (14.2) | 0.42 | 4.1 | 5.9 |
| 1-Vinyl-2-pyrrolidinone | 0.3165 (0.29, 2.85) | 0.2294 (6.6, 3.01) | 6.0 (28.3) | 0.34 | 3.7 | 8.1 |
| 1-Vinyl-2-pyrrolidinone | 0.5028 (0.42, 4.52) | 0.3424 (9.9, 4.49) | 3.0 (14.2) | 0.75 | 1.9 | 22.1 |
| 1-Vinyl-2-pyrrolidinone | 0.7471 (0.63, 6.72) | 0.3423 (9.9, 4.49) | 3.0 (14.2) | 0.61 | 3.5 | 9.2 |
| 1-Vinyl-2-pyrrolidinone | 1.0041 (0.84, 9.04) | 0.3408 (9.9, 4.47) | 3.0 (14.2) | 0.69 | 8.0 | 1.9 |

TABLE 5

4-(Vinyloxy)butyl stearate as Coagent in Maleic Anhydride Grafting on Propylene/Ethylene Copolymer

| Coagent | Coagent, g (mol %, mmol) | LUPEROX 101, g (mmol R·/100 g, mmol R·) | wt % MAH feed (mmol) | wt % MAH graft | Torque Nm | MFR, g/10 min |
|---|---|---|---|---|---|---|
| 4-(Vinyloxy)-butyl stearate | 0.582 (0.14, 1.52) | 0.1119 (3.3, 1.48) | none | not applicable | 1.1 | >100 |
| 4-(Vinyloxy)-butyl stearate | 1.171 (0.29, 3.06) | 0.2401 (6.6, 3.15) | none | not applicable | 0.5 | >100 |
| 4-(Vinyloxy)-butyl stearate | 0.291 (0.07, 0.76) | 0.1198 (3.3, 1.57) | 3.0 (14.2) | — | 1.2 | 38.7 |
| 4-(Vinyloxy)-butyl stearate | 0.455 (0.11, 1.19) | 0.1169 (3.3, 1.53) | 3.0 (14.2) | 0.44 | 2.2 | 22.2 |
| 4-(Vinyloxy)-butyl stearate | 0.581 (0.14, 1.52) | 0.1152 (3.3, 1.51) | 3.0 (14.2) | — | 2.2 | 28.0 |
| 4-(Vinyloxy)-butyl stearate | 0.582 (0.14, 1.52) | 0.1137 (3.3, 1.49) | 3.0 (14.2) | 0.51 | 2.7 | 16.3 |
| 4-(Vinyloxy)-butyl stearate | 0.872 (0.21, 2.28) | 0.1181 (3.3, 1.55) | 3.0 (14.2) | — | 1.7 | 25.8 |
| 4-(Vinyloxy)-butyl stearate | 0.910 (0.22, 2.38) | 0.2347 (6.6, 3.08) | 6.0 (28.3) | 0.66 | 1.5 | 32.4 |
| 4-(Vinyloxy)-butyl stearate | 1.17 (0.29, 3.06) | 0.2293 (6.6, 3.01) | 3.0 (14.2) | 0.80 | 1.5 | >100 |
| 4-(Vinyloxy)-butyl stearate | 1.170 (0.29, 3.06) | 0.2297 (6.6, 3.01) | 6.0 (28.3) | — | 1.6 | 44.8 |

TABLE 6

N-Vinylcaprolactam as Coagent in Maleic Anhydride Grafting on Propylene/Ethylene Copolymer

| Coagent | Coagent, g (mol %, mmol) | LUPEROX 101, g (mmol R·/100 g, mmol R·) | wt % MAH fee (mmol) | wt % MAH graft | Torque, Nm | MFR, g/10 min |
|---|---|---|---|---|---|---|
| N-Vinyl-caprolactam | 0.212 (0.14, 1.52) | 0.1129 (3.3, 1.48) | None | Not applicable | 0.0 | >100 (NM) |

TABLE 6-continued

N-Vinylcaprolactam as Coagent in Maleic Anhydride Grafting on Propylene/Ethylene Copolymer

| Coagent | Coagent, g (mol %, mmol) | LUPEROX 101, g (mmol R·/100 g, mmol R.) | wt % MAH feed (mmol) | wt % MAH graft | Torque, Nm | MFR, g/10 min |
|---|---|---|---|---|---|---|
| N-Vinyl-caprolactam | 0.426 (0.29, 3.06) | 0.2285 (6.6, 3.00) | None | Not applicable | 0.0 | >100 (NM) |
| N-Vinyl-caprolactam | 0.212 (0.14, 1.52) | 0.1153 (3.3, 1.51) | 3.0 (14.2) | 0.22 | 3.4 | 8.5 |
| N-Vinyl-caprolactam | 0.318 (0.21, 2.28) | 0.1160 (3.3, 1.54) | 3.0 (14.2) | 0.22 | 4.6 | 7.7 |
| N-Vinyl-caprolactam | 0.424 (0.28, 3.05) | 0.1189 (3.3, 1.56) | 3.0 (14.2) | 0.22 | 5.3 | 6.1 |
| N-Vinyl-caprolactam | 0.418 (0.28, 3.00) | 0.2306 (6.6, 3.02) | 3.0 (14.2) | 0.29 | 4.1 | 6.1 |
| N-Vinyl-caprolactam | 0.836 (0.56, 6.01) | 0.2278 (6.6, 2.99) | 3.0 (14.2) | 0.29 | 5.7 | 3.0 |
| N-Vinyl-caprolactam | 0.426 (0.29, 3.06) | 0.2282 (6.6, 2.99) | 6.0 (28.3) | 0.48 | 1.9 | 12.3 |
| N-Vinyl-caprolactam | 0.627 (0.42, 4.50) | 0.3418 (9.9, 4.48) | 3.0 (14.2) | 0.49 | 4.2 | 6.8 |

NM = Not Measurable

TABLE 7

N-Vinylcarbazole as Coagent in Maleic Anhydride Grafting on Propylene/Ethylene Copolymer

| Coagent | Coagent, g (mol %, mmol) | LUPEROX 101, g (mmol R·/100 g, mmol R·) | wt % MAH feed (mmol) | wt % MAH graft | Torque, Nm | MFR, g/10 min |
|---|---|---|---|---|---|---|
| N-Vinyl-carbazole | 0.294 (0.14, 1.52) | 0.1198 (3.3, 1.57) | None | Not applicable | 1.2 | >100 (NM) |
| N-Vinyl-carbazole | 0.591 (0.29, 3.06) | 0.2327 (6.6, 3.05) | None | Not applicable | 0.8 | >100 (NM) |
| N-Vinyl-carbazole | 0.294 (0.14. 1.52) | 0.1132 (3.3, 1.48) | 3.0 (14.2) | 0.29 | 2.2 | 15.2 |
| N-Vinyl-carbazole | 0.591 (0.29, 3.06) | 0.2308 (6.6, 3.02) | 6.0 (28.3) | 0.59 | 1.1 | 26.5 |

NM = Not Measurable

1. Double Donating Coagents

Unsaturated molecules substituted with two donating groups on the 1,2 positions of the double bond offer some resonance stabilization, which should result in less polypropylene degradation. Two examples of such double-donating coagents are trans-stilbene and 1,1-diphenylethylene. Tables 8 and 9 show the ability of these molecules to permit the grafting of MAH, while reducing polymer degradation.

Another double-donating molecule is 2-styryl-N-methylpyrrole (A). It was prepared in 85% purity by the procedure described in W. Hinz, R. Alan Jones, and T. Anderson, *Synthesis*, 1986, 8, 620-623, incorporated herein by reference.

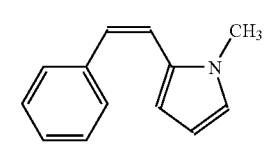

(A)

In a control grafting reaction on the propylene/ethylene copolymer, using approximately 3 mmoles of 2-styryl-N-methylpyrrole (corrected for contaminant), and 3 mmoles of radicals, and no maleic anhydride, gross polymer degradation occurred, as indicated by an unmeasurable MFR as shown in Table 10. In another experiment, using 3 wt % maleic anhydride with the 3 mmole of coagent and radicals, a MFR of 16 resulted, with a MAH graft level of 0.41 wt %. This result is quite similar to the results found with 1-vinylpyrrolidinone as coagent.

TABLE 8

Trans-Stilbene as Coagent in Maleic Anhydride Grafting on Propylene/Ethylene Copolymer

| Coagent | Coagent, g (mol %, mmol) | LUPEROX 101, g (mmol R·/100 g, mmol R·) | wt % MAH feed (mmol) | wt % MAH graft | Torque, Nm | MFR, g/10 min |
|---|---|---|---|---|---|---|
| trans-stilbene | 0.274 (0.14, 1.52) | 0.1176 (3.3. 1.54) | None | Not applicable | 0.6 | >100 (NM) |
| trans-stilbene | 0.552 (0.29, 3.06) | 0.2313 (6.6, 3.03) | None | Not applicable | 0.6 | >100 (NM) |
| trans-stilbene | 0.274 (0.14. 1.52) | 0.1185 (3.3, 1.55) | 3.0 (14.2) | 0.46 | 1.0 | 35.3 |
| trans-stilbene | 0.552 (0.29, 3.06) | 0.2400 (6.6, 3.14) | 6.0 (28.3) | 0.59 | 1.5 | 24.2 |

NM = Not

TABLE 9

1,1-Diphenylethylene as Coagent in Maleic Anhydride Grafting on Propylene/Ethylene Copolymer

| Coagent | Coagent, g (mol %, mmol) | LUPEROX 101, g (mmol R·/100 g, mmol R·) | wt % MAH feed (mmol) | wt % MAH graft | Torque, Nm | MFR, g/10 min |
|---|---|---|---|---|---|---|
| 1,1-diphenyl-ethylene | 0.5517 (0.29, 3.06) | 0.2337 (6.6, 3.06) | None | Not applicable | 2.4 | 14.7 |
| 1,1-diphenyl-ethylene | 0.2685 (0.14, 1.49) | 0.1159 (3.3, 1.52) | 3.0 (14.2) | 0.26 | 2.7 | 5.4 |
| 1,1-diphenyl-ethylene | 0.5496 (0.29, 3.05) | 0.2309 (6.6, 3.03) | 3.0 (14.2) | 0.29 | 2.8 | 4.8 |

TABLE 10

Styryl-N-methylpyrrole as Coagent in Maleic Anhydride Grafting on Propylene/Ethylene Copolymer

| Coagent | Coagent, g (mol %, mmol) | LUPEROX 101, g (mmol R·/100 g, mmol R.) | wt % MAH feed (mmol) | wt % MAH graft | Torque, Nm | MFR, g/10 min |
|---|---|---|---|---|---|---|
| Styryl-N-methylpyrrole | 1.2937@ (0.28, 3.00) | 0.2244 (6.6, 2.94) | None | Not applicable | 1.6 | >150 NM |
| Styryl-N-methylpyrrole | 1.2874@ (0.28, 2.99) | 0.2269 (6.6, 2.97) | 3.0 (14.2) | 0.41 | 3.5 | 15.6 |

@ 50 wt % solution in xylene, 85% pure
NM = Not Measurable

2. Functional Coagents

A functional coagent/grafting agent has the ability to stabilize the PP macroradical, and contains an additional polar functionality, like carboxylic acid, amine, anhydride, and the like. Such a coagent eliminates the need for a third component, like maleic anhydride. Three examples of such coagents are 3-(2-furyl)acrylic acid (C), trans-3-indoleacrylic acid (D), and indole (E) which are shown below.

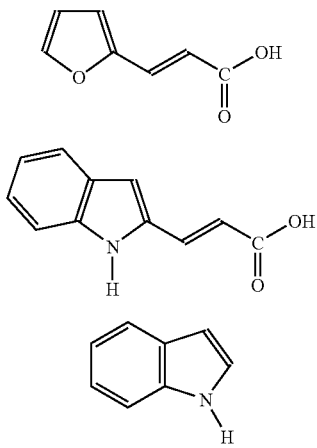

Grafting results using these coagents are summarized in Tables 11 and 12.

TABLE 11

Furylacrylic Acid and Indoleacrylic Acid as Functional Coagent Grafting on Propylene/Ethylene Copolymer

| Coagent | Coagent, g (mol %, mmol) | LUPEROX 101, g (mmol R·/100 g, mmol R·) | wt % MAH feed | wt % equivalent MAH graft | Torque, Nm | MFR, g/10 min |
|---|---|---|---|---|---|---|
| Furylacrylic acid | 0.424 (0.29, 3.07) | 0.1154 (3.3, 1.51) | none | 0.21 | 6.4 | 3.2 |
| Indoleacrylic acid | 0.575 (0.29, 3.07) | 0.1156 (3.3, 1.52) | none | 0.26 + 0.24" | 3.9 | 6.7 |

TABLE 12

Indole as Coagent in Maleic Anhydride Grafting on Propylene/Ethylene Copolymer

| Coagent | Coagent, g (mol %, mmol) | LUPEROX 101, g (mmol R·/100 g, mmol R·) | wt % MAH feed | wt % MAH graft | Torque, Nm | MFR, g/10 min |
|---|---|---|---|---|---|---|
| Indole | 1.66 (1.33, 14.2) | 0.1139 (3.3, 1.49) | none | not applicable | 2.4 | 14.1 |
| Indole | 0.274 (0.22, 2.34) | 0.2354 (6.6, 3.09) | 6.0 | 0.42 | 2.3 | 20.2 |

4) Selected Coagents

Selected coagents were screened with stoichiometric amounts of coagent and radicals, at 1.5 and 3.0 mmol, in the presence of 3.0 wt % maleic anhydride in 45.0 grams of propylene/ethylene copolymer, with results summarized in Table 13.

TABLE 13

Propylene/Ethylene Copolymer Reacted with 3.0 wt % Maleic Anhydride, 1.5 and 3.0 mmol Stoichiometric Equivalents of Various Commercial Coagents and LUPEROX ™ 101 Radicals

| Coagent | mmol R· | wt % Grafted MAH | MFR (g/10 min) |
|---|---|---|---|
| 4-(vinyloxy)butyl stearate | 1.5 | 0.51 | 16 |
|  | 3.0 | 0.80 | >100 |
| N-vinylpyrrolidinone | 1.5 | 0.35 | 9 |
|  | 3.0 | 0.45 | 15 |
| N-vinylcaprolactam | 1.5 | 0.22 | 9 |
|  | 3.0 | 0.29 | 6 |
| 9-vinylcarbazole | 1.5 | 0.29 | 15 |
|  | 3.0 | 0.59 | 27 |
| trans-stilbene | 1.5 | 0.46 | 35 |
|  | 3.0 | 0.59 | 24 |
| α-methylstyrene | 1.5 | 0.47 | 9 |
|  | 3.0 | 0.53 | 21 |
| 1,1-diphenylethylene | 1.5 | 0.26 | 5 |
|  | 3.0 | 0.29 | 5 |

The results provide a clear indication of a synergistic effect of the coagent and maleic anhydride to reduce polymer degradation, as indicated by MFR. These results indicate that the presence of MAH with the coagent radical is necessary to shorten the radical chain, and reduce polymer scissioning. It was also discovered that a radical formed from a coagent, like N-vinylpyrrolidinone (NVP), is reactive enough to abstract the tertiary hydrogen in the polypropylene, and degrade the polypropylene. However, when MAH is present, in addition to the NVP, the NVP radical can add to the MAH, which is able to proceed to a disproportionation step, for example, either via the PP backbone, or perhaps via the disproportionation of the succinyl radical.

Although the invention has been described in certain detail through the preceding specific embodiments, this detail is for the primary purpose of illustration. Many variations and modifications can be made by one skilled in the art, without departing from the spirit and scope of the invention, as described in the following claims.

The invention claimed is:

1. A composition comprising at least one propylene-based polymer, at least one peroxide, at least one grafting agent, and at least one coagent, and
wherein the at least one coagent has a substituted carbon-carbon double bond structure selected from the group consisting of the following:

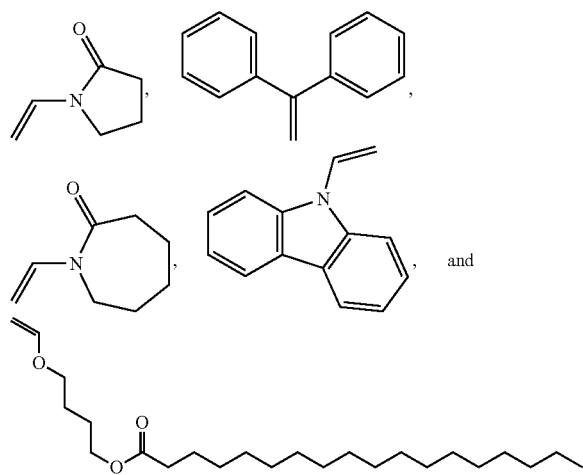

wherein the molar ratio of the "coagent(s)" to "free radicals formed from the peroxide(s)" is from 1:1 to 3:1; and
wherein the molar ratio of the grafting agent to the coagent is from 2/1 to 20/1.

2. The composition of claim 1, wherein the coagent has a HOMO greater than −8 eV.

3. The composition of claim 1, wherein the propylene-based polymer is a propylene/α-olefin interpolymer or a propylene/ethylene interpolymer.

4. The composition of claim 3, wherein the propylene-based polymer is a propylene/ethylene interpolymer.

5. The composition of claim 4, wherein the propylene/ethylene interpolymer has a density from 0.83 g/cc to 0.90 g/cc.

6. The composition of claim 4, wherein the propylene/ethylene interpolymer has melt flow rate (MFR) from 0.1 g/10 min to 100 g/10 min, at 230° C./2.16 kg.

7. An article comprising at least one component formed from the composition of claim 1.

8. A functionalized propylene-based polymer formed by reacting the composition of claim 1.

9. A composition comprising the functionalized propylene-based polymer of claim 8.

* * * * *